US009751262B2

(12) United States Patent
Graham et al.

(10) Patent No.: US 9,751,262 B2
(45) Date of Patent: Sep. 5, 2017

(54) SYSTEMS AND METHODS FOR CREATING COMPENSATED DIGITAL REPRESENTATIONS FOR USE IN ADDITIVE MANUFACTURING PROCESSES

(71) Applicant: General Electric Company, Schenectady, NY (US)

(72) Inventors: Michael Evans Graham, Slingerlands, NY (US); William Thomas Carter, Galway, NY (US); Mark Allen Cheverton, Mechanicville, NY (US); Pinghai Yang, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1047 days.

(21) Appl. No.: 13/930,097

(22) Filed: Jun. 28, 2013

(65) Prior Publication Data
US 2015/0004046 A1 Jan. 1, 2015

(51) Int. Cl.
*B33Y 50/02* (2015.01)
*B29C 67/00* (2017.01)
(Continued)

(52) U.S. Cl.
CPC ........ *B29C 67/0088* (2013.01); *B22F 3/1055* (2013.01); *B29C 67/0077* (2013.01);
(Continued)

(58) Field of Classification Search
None
See application file for complete search history.

(56) References Cited

U.S. PATENT DOCUMENTS 5,141,677 A 8/1992 Fogarty
5,460,758 A 10/1995 Langer et al.
(Continued)

FOREIGN PATENT DOCUMENTS

CN 1453748 A 11/2003
CN 1497480 A 5/2004
(Continued)

OTHER PUBLICATIONS

Nelson et al., "Improvements in SLS Part Accuracy", pp. 159-169, 1995.
(Continued)

*Primary Examiner* — Jason Mitchell
(74) *Attorney, Agent, or Firm* — Nitin N. Joshi

(57) ABSTRACT

A system for fabricating a component includes an additive manufacturing device and a computing device. The additive manufacturing device is configured to fabricate a first component by sequentially forming a plurality of superposed layers based upon a nominal digital representation of a second component, which includes a plurality of nominal digital two-dimensional cross-sections, each corresponding to a layer of the first component. The computing device includes a processor, wherein for an $i^{th}$ layer of the first component, the processor is configured to (a) generate a cumulative compensation transformation; (b) apply the cumulative compensation transformation to the nominal digital two-dimensional cross-section corresponding to the $i^{th}$ layer to create an intermediate digital two-dimensional cross-section corresponding to the $i^{th}$ layer; (c) determine a local compensation transformation; and (d) apply the local compensation transformation to the intermediate digital two-dimensional cross-section corresponding to the $i^{th}$ layer.

8 Claims, 30 Drawing Sheets

(51) Int. Cl.
  *B22F 3/105* (2006.01)
  *G06T 19/00* (2011.01)
  *B33Y 10/00* (2015.01)
(52) U.S. Cl.
  CPC .............. *B33Y 10/00* (2014.12); *B33Y 50/02* (2014.12); *G06T 19/00* (2013.01); *B22F 2003/1056* (2013.01); *B22F 2003/1057* (2013.01); *Y02P 10/295* (2015.11)

(56) References Cited

U.S. PATENT DOCUMENTS

| | | | |
|---|---|---|---|
| 6,767,499 | B1 | 7/2004 | Hory et al. |
| 7,087,200 | B2 | 8/2006 | Taboas et al. |
| 7,393,699 | B2 | 7/2008 | Tran |
| 7,651,506 | B2 | 1/2010 | Bova et al. |
| 7,867,431 | B2 | 1/2011 | Higashi et al. |
| 8,048,359 | B2 | 11/2011 | Wang et al. |
| 8,303,886 | B2 | 11/2012 | Philippi |
| 2005/0029711 | A1 | 2/2005 | Abe et al. |
| 2005/0116391 | A1* | 6/2005 | Lindemann ........... B22F 3/1055 264/497 |
| 2008/0118665 | A1* | 5/2008 | Slaughter ............ B22F 3/1055 427/595 |
| 2010/0125356 | A1* | 5/2010 | Shkolnik ............ B29C 67/0088 700/98 |
| 2012/0133080 | A1 | 5/2012 | Moussa et al. |
| 2012/0232685 | A1 | 9/2012 | Wang et al. |
| 2013/0069282 | A1 | 3/2013 | Abe et al. |
| 2014/0277669 | A1* | 9/2014 | Nardi ................... G05B 19/042 700/103 |
| 2015/0048064 | A1* | 2/2015 | Cheverton ........... B22F 3/1055 219/121.63 |

FOREIGN PATENT DOCUMENTS

| | | |
|---|---|---|
| CN | 102985199 A | 3/2013 |
| EP | 1301140 B1 | 11/2010 |
| WO | 2007147221 A1 | 12/2007 |

OTHER PUBLICATIONS

Pandey et al., "Rapid Prototyping Technologies, Applications and Part Deposition Planning", pp. 1-14+1, 2005.
Raghunath et al., "Improving accuracy through shrinkage modelling by using Taguchi method in selective laser Sintering", International Journal of Machine Tools and Manufacture, vol. No. 47, Issue No. 6, pp. 985-995, Feb. 9, 2007.
International Search Report and Written Opinion issued in connection with corresponding PCT Application No. PCT/US2014/044484 dated Dec. 10, 2014.
K. Dai et al., "Distortion Minimization of Laser-Processed Components Through Control of Laser Scanning Patterns", Rapid Prototyping Journal, (2002), vol. 8, No. 5, pp. 270-276.
Y. Tang et al., "Accuracy Analysis and Improvement for Direct Laser Sintering", Innovation in Manufacturing Systems and Technology (2004), pp. 1-8.
Maarten Moesen et al., "Robust Beam Compensation for Laser-Based Additive Manufacturing", Computer-Aided Design, (2011), vol. 43, pp. 876-888.
K. Senthilkumaran et al., "New Model for Shrinkage Compensation in Selective Laser Sintering", Virtual and Physical Prototyping, (2009), vol. 4, No. 2, pp. 49-62.
Ozkan Ilkgun, "Effects of Production Parameters on Porosity and Hole Properties in Laser Sintering Rapid Prototyping Process", A Thesis Submitted to the Graduate School of Natural and Applied Sciences of Middle East Technical University, Sep. 2005, pp. 1-144.
Debasish Dutta et al., "Layered Manufacturing: Current Status and Future Trends", Journal of Computing and Information Science in Engineering, (2001), vol. 1, pp. 60-71.
Y. Ning et al., "An Approach to Minimize Build Errors in Direct Metal Laser Sintering", IEEE Transactions on Automation Science and Engineering, (2006), vol. 3, Issue, 1, pp. 73-80.
Unofficial English Translation of Chinese Office Action issued in connection with corresponding CN Application No. 201480037073.6 dated May 26, 2017.

* cited by examiner

1300

$$\begin{bmatrix} a_{i1} & a_{i2} & \ldots & a_{ij} & \ldots & a_{ik} \\ b_{i1} & b_{i2} & & b_{ij} & & b_{ik} \end{bmatrix}$$

FIG. 13

$$1502 \rightarrow \begin{bmatrix} x_{11} & 0 & \cdots & \cdots \\ y_{11} & 0 & \cdots & \cdots \\ 1 & 0 & & \\ 0 & x_{12} & & \\ 0 & y_{12} & \vdots & \vdots \\ 0 & 1 & & \\ & & x_{13} & \\ \vdots & \cdots & y_{13} & \vdots \\ & & 1 & \\ & & & x_{14} \\ \vdots & \vdots & \vdots & y_{14} \\ & & & 1 \end{bmatrix} \quad 1504 \rightarrow \begin{bmatrix} x_{21} & 0 & \cdots & \cdots \\ y_{21} & 0 & \cdots & \cdots \\ 1 & 0 & & \\ 0 & x_{22} & & \\ 0 & y_{22} & \vdots & \vdots \\ 0 & 1 & & \\ & & x_{23} & \\ \vdots & \cdots & y_{23} & \vdots \\ & & 1 & \\ & & & x_{24} \\ \vdots & \vdots & \vdots & y_{24} \\ & & & 1 \end{bmatrix} \quad 1506 \rightarrow \begin{bmatrix} x_{31} & 0 & \cdots & \cdots \\ y_{31} & 0 & \cdots & \cdots \\ 1 & 0 & & \\ 0 & x_{32} & & \\ 0 & y_{32} & \vdots & \vdots \\ 0 & 1 & & \\ & & x_{33} & \\ \vdots & \cdots & y_{33} & \vdots \\ & & 1 & \\ & & & x_{34} \\ \vdots & \vdots & \vdots & y_{34} \\ & & & 1 \end{bmatrix}$$

$$1508 \rightarrow \begin{bmatrix} a_{11} & 0 & \cdots & \cdots \\ b_{11} & 0 & \cdots & \cdots \\ 1 & 0 & & \\ 0 & a_{12} & & \\ 0 & b_{12} & \vdots & \vdots \\ 0 & 1 & & \\ & & a_{13} & \\ \vdots & \cdots & b_{13} & \vdots \\ & & 1 & \\ & & & a_{14} \\ \vdots & \vdots & \vdots & b_{14} \\ & & & 1 \end{bmatrix} \quad 1510 \rightarrow \begin{bmatrix} a_{21} & 0 & \cdots & \cdots \\ b_{21} & 0 & \cdots & \cdots \\ 1 & 0 & & \\ 0 & a_{22} & & \\ 0 & b_{22} & \vdots & \vdots \\ 0 & 1 & & \\ & & a_{23} & \\ \vdots & \cdots & b_{23} & \vdots \\ & & 1 & \\ & & & a_{24} \\ \vdots & \vdots & \vdots & b_{24} \\ & & & 1 \end{bmatrix} \quad 1512 \rightarrow \begin{bmatrix} a_{31} & 0 & \cdots & \cdots \\ b_{31} & 0 & \cdots & \cdots \\ 1 & 0 & & \\ 0 & a_{32} & & \\ 0 & b_{32} & \vdots & \vdots \\ 0 & 1 & & \\ & & a_{33} & \\ \vdots & \cdots & b_{33} & \vdots \\ & & 1 & \\ & & & a_{34} \\ \vdots & \vdots & \vdots & b_{34} \\ & & & 1 \end{bmatrix}$$

FIG. 15

$$
\underset{1602}{\begin{bmatrix} 1 & 0 & 0 & 0 & 0 & 0 & & & & & & \\ 0 & 1 & 0 & 0 & 0 & 0 & \cdots & & \cdots & & & \\ 0 & 0 & 1 & 0 & 0 & 0 & & & & & & \\ 0 & 0 & 0 & 1 & 0 & 0 & & & & & & \\ 0 & 0 & 0 & 0 & 1 & 0 & \vdots & & \vdots & & & \\ 0 & 0 & 0 & 0 & 0 & 1 & & & & & & \\ & & & & & & 1 & 0 & 0 & & & \\ \vdots & & \vdots & & & & 0 & 1 & 0 & & \vdots & \\ & & & & & & 0 & 0 & 1 & & & \\ & & & & & & & & & 1 & 0 & 0 \\ \vdots & & \vdots & & & & \vdots & & & 0 & 1 & 0 \\ & & & & & & & & & 0 & 0 & 1 \end{bmatrix}} \cdot \underset{1502}{\begin{bmatrix} x_{11} & 0 & & \\ y_{11} & 0 & \cdots & \cdots \\ 1 & 0 & & \\ 0 & x_{12} & & \\ 0 & y_{12} & \vdots & \vdots \\ 0 & 1 & & \\ & & x_{13} & \\ \vdots & \cdots & y_{13} & \vdots \\ & & 1 & \\ & & & x_{14} \\ \vdots & \vdots & \vdots & y_{14} \\ & & & 1 \end{bmatrix}} = \underset{1604}{\begin{bmatrix} x_{11} & 0 & & \\ y_{11} & 0 & \cdots & \cdots \\ 1 & 0 & & \\ 0 & x_{12} & & \\ 0 & y_{12} & \vdots & \vdots \\ 0 & 1 & & \\ & & x_{13} & \\ \vdots & \cdots & y_{13} & \vdots \\ & & 1 & \\ & & & x_{14} \\ \vdots & \vdots & \vdots & y_{14} \\ & & & 1 \end{bmatrix}}
$$

FIG. 16

$$
\begin{bmatrix}
x_{11} & y_{11} & 1 & 0 & 0 & 0 & \cdots & x_{12} & y_{12} & 1 & 0 & 0 & 0 & \cdots & & x_{13} & y_{13} & 1 & \cdots & & x_{14} & y_{14} & 1
\end{bmatrix}_{1604}
-
\begin{bmatrix}
a_{11} & b_{11} & 1 & 0 & 0 & 0 & \cdots & a_{12} & b_{12} & 1 & 0 & 0 & 0 & \cdots & & a_{13} & b_{13} & 1 & \cdots & & a_{14} & b_{14} & 1
\end{bmatrix}_{1508}
=
\begin{bmatrix}
x_{11}-a_{11} & y_{11}-b_{11} & 1 & 0 & 0 & 0 & \cdots & x_{12}-a_{12} & y_{12}-b_{12} & 1 & \cdots & & x_{13}-a_{13} & y_{13}-b_{13} & 1 & \cdots & & x_{14}-a_{14} & y_{14}-b_{14} & 1
\end{bmatrix}_{1704}
$$

$$
\begin{bmatrix}
1 & 0 & 0 & 0 & 0 & 0 & \cdots & & & & \\
0 & 1 & (1102) & 0 & 0 & 0 & \cdots & & & & \\
0 & 0 & 0 & 1 & 0 & 0 & \cdots & 1 & 0 & 0 & \cdots \\
0 & 0 & 0 & 0 & 1 & (1102) & \cdots & 0 & 1 & (1102) & \cdots & 1 & 0 & 0 \\
0 & 0 & 0 & 0 & 0 & 1 & \cdots & 0 & 0 & 0 & \cdots & 0 & 1 & (1102) & \cdots & 1 & 0 & 0 \\
& & & & & & & & & & & 0 & 0 & 0 & \cdots & 0 & 1 & (1102) \\
& & & & & & & & & & & & & & & 0 & 0 & 1
\end{bmatrix}_{1702}
$$

FIG. 17

$$\begin{bmatrix} 1 & 0 & 0 & 0 & 0 & 0 & \cdots & \cdots & \cdots \\ 0 & 1 & (1102) & 0 & 0 & 0 & & & \\ 0 & 0 & 1 & 0 & 0 & 0 & & & \\ 0 & 0 & 0 & 1 & 0 & 0 & & & \\ 0 & 0 & 0 & 0 & 1 & (1102) & & & \\ 0 & 0 & 0 & 0 & 0 & 1 & & & \\ \vdots & & & & & & \cdots & & \\ \vdots & & & & & & & \cdots & \\ & & & & & & & & 1 & 0 & 0 \\ & & & & & & & & 0 & 1 & (1102) \\ & & & & & & & & 0 & 0 & 1 \end{bmatrix} \cdot \begin{bmatrix} x_{11} & y_{11} & 1 \\ 0 & 0 & 0 \\ 0 & 0 & 0 \\ x_{12} & y_{12} & 1 \\ \vdots & \vdots & \vdots \\ \vdots & \vdots & \vdots \\ x_{13} & y_{13} & 1 \\ \vdots & \vdots & \vdots \\ x_{14} & y_{14} & 1 \end{bmatrix} = \begin{bmatrix} x_{11} + (1102) \\ y_{11} + 1 \\ 0 & 0 & 0 \\ x_{12} + (1102) \\ y_{12} + 1 \\ \vdots & \vdots & \vdots \\ x_{13} \\ y_{13} + (1102) \\ 1 \\ \vdots & \vdots & \vdots \\ x_{14} \\ y_{14} + (1102) \\ 1 \end{bmatrix}$$

1702 → (leftmost matrix)  1604 → (middle matrix)  1802 → (rightmost matrix)

FIG. 18

FIG. 19A $$\begin{bmatrix} x_{21}+(1102) & 0 & 0 & \cdots & x_{22}+(1102) & 0 & 0 & \cdots & x_{23} & \cdots & x_{24}+(1102) \\ y_{21}+(1102) & 0 & 0 & \cdots & y_{22}+(1102) & 0 & 0 & \cdots & y_{23}+(1102) & \cdots & y_{24}+(1102) \\ 1 & 0 & 0 & \cdots & 1 & 0 & 0 & \cdots & 1 & \cdots & 1 \end{bmatrix}$$

1904

$$- \begin{bmatrix} a_{21} & 0 & 0 & \cdots & a_{22} & 0 & 0 & \cdots & a_{23} & \cdots & a_{24} \\ b_{21} & 0 & 0 & \cdots & b_{22} & 0 & 0 & \cdots & b_{23} & \cdots & b_{24} \\ 1 & 0 & 0 & \cdots & 1 & 0 & 0 & \cdots & 1 & \cdots & 1 \end{bmatrix} =$$

1510

Ⓐ

$$\begin{bmatrix} 1 & 0 & 0 & 0 & 0 & 0 & 0 & \cdots & 1 & 0 & 0 & \cdots & 1 & 0 & 0 \\ 0 & 1 & -(2404) & 0 & 0 & 0 & 0 & \cdots & 0 & 1 & -(2404) & \cdots & 0 & 1 & -(2404) \\ 0 & 0 & 1 & 0 & 0 & 0 & 0 & \cdots & 0 & 0 & 1 & \cdots & 0 & 0 & 1 \end{bmatrix}$$

1906

Ⓑ

FIG. 19B $$\begin{bmatrix} 1 & 0 & -(2404) & 0 & 0 & 0 & \cdots & 0 \\ 0 & 1 & 0 & 0 & 0 & 0 & \cdots & 0 \\ 0 & 0 & 1 & 0 & -(2404) & 0 & \cdots & 0 \\ 0 & 0 & 0 & 1 & 0 & 0 & \cdots & 0 \\ 0 & 0 & 0 & 0 & 1 & 0 & \cdots & -(2404) \\ 0 & 0 & 0 & 0 & 0 & 1 & \cdots & 0 \\ \vdots & \vdots & \vdots & \vdots & \vdots & \vdots & \cdots & \vdots \\ 0 & 0 & 0 & 0 & 0 & 0 & \cdots & 1 \end{bmatrix} \cdot \begin{bmatrix} x_{21} + (1102) \\ y_{21} + (1102) \\ 1 \\ 0 \\ 0 \\ 0 \\ \vdots \\ x_{22} \\ y_{22} + (1102) \\ 1 \\ 0 \\ 0 \\ \vdots \\ x_{23} \\ y_{23} + (1102) \\ 1 \\ \vdots \\ x_{24} \\ y_{24} + (1102) \\ 1 \end{bmatrix}$$

↗ 1906 ↗ 1904

$$= \begin{bmatrix} x_{21} + (1102) - (2404) \\ y_{21} + (1102) \\ 1 \\ 0 \\ 0 \\ 0 \\ \vdots \\ x_{22} + (1102) - (2404) \\ y_{22} + (1102) \\ 1 \\ 0 \\ 0 \\ \vdots \\ x_{23} + (1102) - (2404) \\ y_{23} + (1102) \\ 1 \\ \vdots \\ x_{24} + (1102) - (2404) \\ y_{24} + (1102) \\ 1 \end{bmatrix}$$

FIG. 20B $$\begin{bmatrix} 1 & 0 & -(2408) & 0 & 0 & 0 & \cdots \\ 0 & 1 & -(2408) & 0 & 0 & 0 & \cdots \\ 0 & 0 & 0 & 1 & 0 & -(2408) & \cdots \\ 0 & 0 & 0 & 0 & 1 & -(2408) & \cdots \\ 0 & 0 & 0 & 0 & 0 & 0 & \cdots \\ 0 & 0 & 0 & 0 & 0 & 0 & \cdots \\ \vdots & \vdots & \vdots & \vdots & \vdots & \vdots & \\ 1 & 0 & 0 \\ 0 & 1 & 0 \\ 0 & 0 & 1 \\ 1 & 0 & 0 \\ 0 & 1 & 0 \\ 0 & 0 & 1 \\ \vdots & \vdots & \vdots \\ 1 & 0 & -(2408) \\ 0 & 1 & -(2408) \\ 0 & 0 & 1 \end{bmatrix} \cdot \begin{bmatrix} x_{31} + (2304) & & & & & \\ y_{31} & 1 & & & & \\ 0 & 0 & x_{32} & & & \\ 0 & 0 & y_{32} + (2304) & & & \\ 0 & 0 & 1 & & & \\ & & & x_{33} & & \\ \vdots & \vdots & \vdots & y_{33} + (2304) & \cdots & x_{34} \\ & & & 1 & & y_{34} + (2304) \\ & & & & & 1 \end{bmatrix}$$

↖ 2006    ↖ 2004

$$= \begin{bmatrix} x_{31} & & & & & \\ y_{31} + (2304) - (2408) & 1 & & & & \\ 0 & 0 & x_{32} & & & \\ 0 & 0 & y_{32} + (2304) - (2408) & & & \\ 0 & 0 & 1 & & & \\ & & & x_{33} & & \\ \vdots & \vdots & \vdots & y_{33} + (2304) - (2408) & \cdots & x_{34} \\ & & & 1 & & y_{34} + (2304) - (2408) \\ & & & & & 1 \end{bmatrix}$$

SYSTEMS AND METHODS FOR CREATING COMPENSATED DIGITAL REPRESENTATIONS FOR USE IN ADDITIVE MANUFACTURING PROCESSES

BACKGROUND

The field of the disclosure relates generally to additive manufacturing systems and, more particularly, to systems for creating compensated digital representations for use in additive manufacturing processes.

Additive manufacturing systems and processes are used to fabricate precision three-dimensional components from a digital model. Such components are fabricated using an additive process, where successive layers of material are solidified one on top of the other. At least some known additive manufacturing systems use a laser (or similar energy sources) and a series of lenses and mirrors to direct the laser over a powdered material in a pattern provided by a digital model. The laser solidifies the powdered material by sintering or melting the powdered material.

However, as a component cools both during and after the additive manufacturing process, the layers of the component shift relative to their as-built position due to the release of thermal and mechanical stresses and strains within the component. As a result, the built component has distortions that make the component unusable without further processing to provide an acceptable level of geometric precision.

At least some known additive manufacturing processes have attempted to compensate the digital model used to fabricate a component by offsetting the digital model by a fixed amount. However, the accuracy of components fabricated from such compensated digital models is less than desirable, in part because these compensated digital models do not account for local variations between adjacent layers of a component.

Accordingly, a need exists for systems and methods that provide more accurate compensated digital models for use in additive manufacturing processes.

BRIEF DESCRIPTION

In one aspect, a system for fabricating a component is provided. The system includes an additive manufacturing device and a computing device coupled to the additive manufacturing device. The additive manufacturing device is configured to fabricate a first component by sequentially forming a plurality of superposed layers based upon a nominal digital representation of a second component. The nominal digital representation includes a plurality of nominal digital two-dimensional cross-sections, each corresponding to a layer of the first component. The computing device includes a memory device and a processor. The memory device is configured to store the nominal digital representation of the second component. For an $i^{th}$ layer of the first component, the processor is configured to (a) generate a cumulative compensation transformation associated with the $i^{th}$ layer; (b) apply the cumulative compensation transformation associated with the $i^{th}$ layer to the nominal digital two-dimensional cross-section corresponding to the $i^{th}$ layer to create an intermediate digital two-dimensional cross-section corresponding to the $i^{th}$ layer; (c) determine a local compensation transformation for the $i^{th}$ layer; (d) apply the local compensation transformation for the $i^{th}$ layer to the intermediate digital two-dimensional cross-section corresponding to the $i^{th}$ layer to create a compensated digital two-dimensional cross-section corresponding to the $i^{th}$ layer; and (e) perform (a) through (d) for at least one other layer of the first component.

In a further aspect, a method of fabricating a component using an additive manufacturing process is provided. The method includes fabricating a first component by sequentially forming a plurality of superposed layers based upon a nominal digital representation of a second component. The nominal digital representation includes a plurality of nominal digital two-dimensional cross-sections, each corresponding to a layer of the first component. The method further includes, for an $i^{th}$ layer of the first component, (a) generating a cumulative compensation transformation associated with the $i^{th}$ layer; (b) applying the cumulative compensation transformation associated with the $i^{th}$ layer to the nominal digital two-dimensional cross-section corresponding to the $i^{th}$ layer to create an intermediate digital two-dimensional cross-section corresponding to the $i^{th}$ layer; (c) determining a local compensation transformation for the $i^{th}$ layer; (d) applying the local compensation transformation for the $i^{th}$ layer to the intermediate digital two-dimensional cross-section corresponding to the $i^{th}$ layer to create a compensated digital two-dimensional cross-section corresponding to the $i^{th}$ layer; and (e) performing (a) through (d) for at least one other layer of the first component.

In another aspect, a system for generating a compensated digital representation of a three-dimensional object is provided. Generating the compensated digital representation is based upon the fabrication of a first three-dimensional object fabricated by sequentially forming a plurality of superposed layers. Sequentially forming a plurality of superposed layers is based upon a nominal digital representation of the three-dimensional object. The nominal digital representation of the three-dimensional object includes a plurality of nominal digital two-dimensional cross-sections, each corresponding to a layer of the first three-dimensional object. The system includes a memory device and a processor. The memory device is configured to store the nominal digital representation of the three-dimensional object. For an $i^{th}$ layer of the first three-dimensional object, the processor is configured to (a) generate a cumulative compensation transformation associated with the $i^{th}$ layer; (b) apply the cumulative compensation transformation associated with the $i^{th}$ layer to the nominal digital two-dimensional cross-section corresponding to the $i^{th}$ layer to create an intermediate digital two-dimensional cross-section corresponding to the $i^{th}$ layer; (c) determine a local compensation transformation for the $i^{th}$ layer; (d) apply the local compensation transformation for the $i^{th}$ layer to the intermediate digital two-dimensional cross-section corresponding to the $i^{th}$ layer to create a compensated digital two-dimensional cross-section corresponding to the $i^{th}$ layer; and (e) perform (a) through (d) for at least one other layer of the first three-dimensional object.

DRAWINGS

These and other features, aspects, and advantages of the present disclosure will become better understood when the following detailed description is read with reference to the accompanying drawings in which like characters represent like parts throughout the drawings, wherein:

FIG. 13 is a representative illustration of measurement data received by a computing device during the method shown in FIG. 12;

FIG. 15 is a representative illustration of the data object shown in FIG. 4 and the measurement data set shown in FIG. 14 in alternate formats;

FIG. 16 is a representative illustration of a cumulative compensation transformation associated with a first layer of the component shown in FIG. 3;

FIG. 17 is a representative illustration of a local compensation transformation associated with a first layer of the component shown in FIG. 3;

FIG. 18 is a representative illustration of a tensor matrix representing a compensated digital two-dimensional cross-section associated with a first layer of the component shown in FIG. 3;

FIG. 19A is a representative illustration of a method for generating a compensated digital two-dimensional cross-section associated with a second layer of the component shown in FIG. 3;

FIG. 19B is a continuation of FIG. 19A;

FIG. 19C is a continuation of FIG. 19B;

FIG. 20A is a representative illustration of a method for generating a compensated digital two-dimensional cross-section associated with a third layer of the component shown in FIG. 3;

FIG. 20B is a continuation of FIG. 20A;

FIG. 20C is a continuation of FIG. 20B;

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The systems and methods described herein facilitate fabrication of more precise components using additive manufacturing systems. Specifically, the systems and methods described herein facilitate generating more accurate compensated digital representations for use in additive manufacturing processes. The systems and methods described herein facilitate determining a localized difference between adjacent layers within a component, and determining and applying a local compensation transformation corresponding to the localized difference to a digital representation and/or a segment of a digital representation. Therefore, in contrast to known additive manufacturing systems and methods, the systems and methods described herein provide compensated digital representations which account for localized differences between adjacent layers of components, and provide more precise fabricated components.

Figure 1:
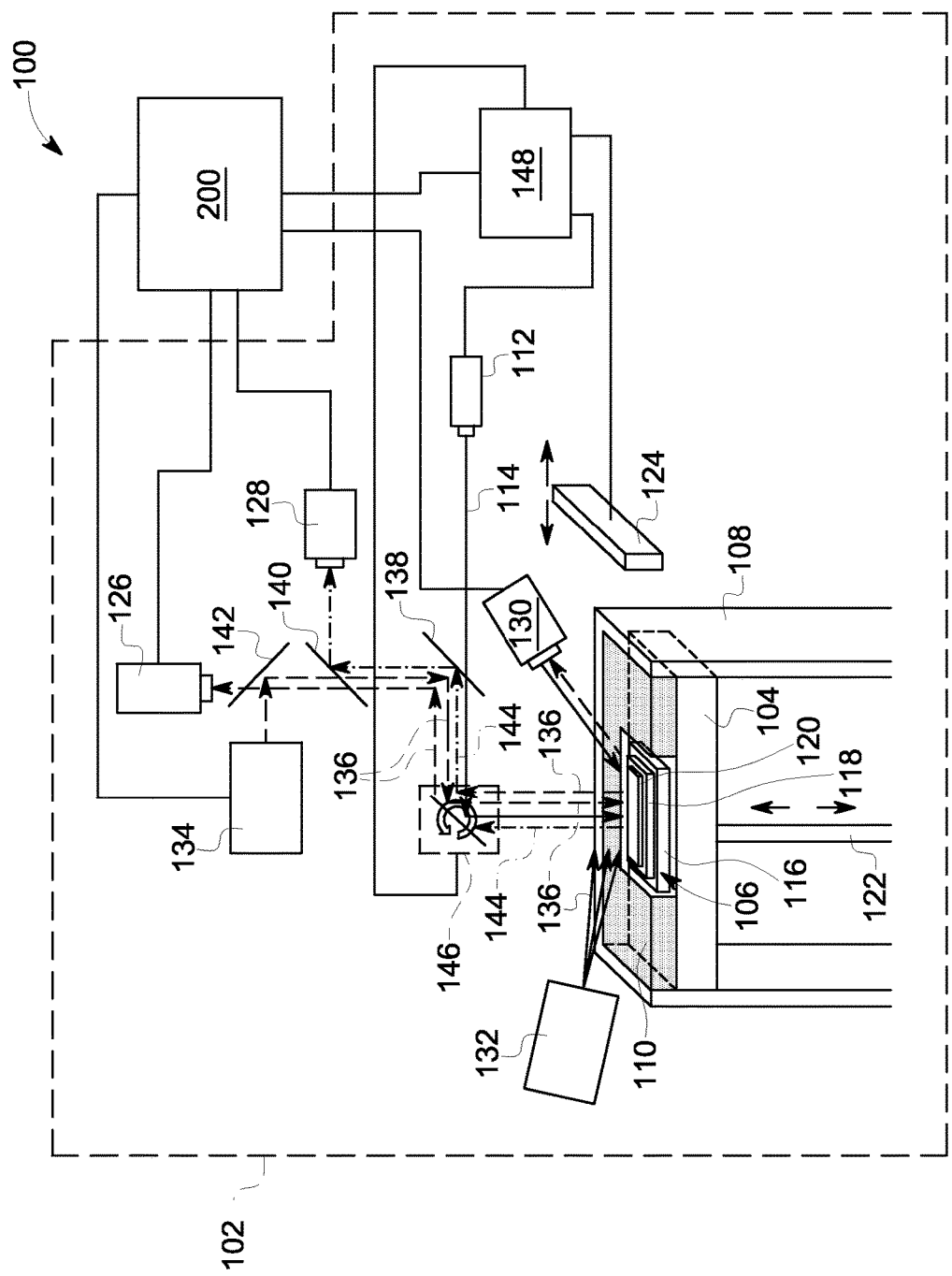
FIG. 1 is a schematic illustration of an example additive manufacturing system that includes a computing device.

FIG. 1 is a schematic illustration of an example additive manufacturing system 100, e.g., a selective laser sintering system that includes an additive manufacturing device 102 and a computing device 200. Although the embodiments herein are described with reference to a selective laser sintering system, this disclosure may also apply to other types of additive manufacturing systems, such as liquid-resin based additive manufacturing systems (e.g., stereolithograpy systems).

In the example embodiment, additive manufacturing device 102 includes a build platform 104 for supporting a three-dimensional component 106 during the additive manufacturing process, a reservoir 108 of build material 110, and an energy source 112 that emits an energy beam 114 for sintering, curing, hardening, or otherwise solidifying build material 110 to form a plurality of superposed layers 116, 118, and 120 making up component 106. A front wall of reservoir 108 is omitted in FIG. 1 for illustration. Similarly, portions of build material 110 are omitted in FIG. 1 for illustration. In the example embodiment, three-dimensional component 106 is an aircraft component, although additive manufacturing system 100 may be used to fabricate any three-dimensional component. Build platform 104 is coupled to vertical adjuster 122 such that build platform may be raised and/or lowered to adjust the plane in which build material 110 is to be solidified.

In the example embodiment, energy source 112 is a laser. More specifically, energy source 112 is a gas laser, such as a $CO_2$ laser. In alternative embodiments, energy source 112 may be any suitable energy source for sintering, curing, hardening, or otherwise solidifying build material 110, such as, for example, an ultraviolet laser or light source.

Further, in the example embodiment, build material 110 is a metallic powder. More specifically, build material 110 is a gas atomized metal powder (e.g., cobalt, iron, aluminum, titanium and/or nickel alloys) having a mean particle size within a range of between approximately 10 and 100 microns. In alternative embodiments, build material 110 may be a thermoset or thermoplastic resin, or a sheet of formable material (e.g. metal, paper, or composite fabric).

In the example embodiment, additive manufacturing device 102 also includes a build material dispenser 124 for providing a thin layer of build material 110 over a previously formed layer. In alternative embodiments, such as systems employing liquid resin for build material 110 (e.g., stereolithography devices), build material dispenser 124 may be omitted, and a layer of unsolidified build material may be provided over the previously formed layer by lowering build platform 104 and allowing liquid build material to flow over the previously formed layer.

In the example embodiment, additive manufacturing device 102 also includes an optical imaging device 126, an infrared imaging device 128, and a CT X-ray imaging device 130, each coupled to computing device 200. Imaging devices 126, 128, and 130 may be used in conjunction with or independently of one another to record and/or store data (e.g., images) associated with layers 116, 118, and 120 and/or component 106 both during a build process and after a build process has been completed. Additive manufacturing device 102 also includes one or more visible light sources 132 and 134 which emit visible light 136 such that optical imaging device 126 may record and store data associated with layers 116, 118, and 120 and/or component 106. In alternative embodiments, additive manufacturing device 102 may include any combination of imaging devices 126, 128, and 130 (e.g., infrared imaging device 128 may be omitted), and/or additive manufacturing device 102 may include multiple imaging devices of the same type (e.g., two optical imaging devices 126). In the example embodiment, data recorded by imaging devices 126, 128, and 130 is stored in memory device 202 of computing device 200, best seen in FIG. 2.

In the example embodiment, additive manufacturing device 102 includes several beam splitters 138, 140, and 142 configured to direct one or more beams towards a desired target. For example, beam splitter 138 is configured to permit passage of energy beam 114, and reflect infrared radiation 144 emitted from component 106 towards beam splitter 140, which is configured to reflect infrared radiation 144 towards infrared imaging device 128. In the example embodiment, beam splitter 140 is a dichroic beam splitter configured to reflect light waves in the infrared spectrum, and transmit light waves in the visible spectrum. Any suitable combination and configuration of beam splitters 138, 140, and 142 may be used in additive manufacturing device 102 that enables additive manufacturing device 102 and/or additive manufacturing system 100 to function as described herein.

In the example embodiment, additive manufacturing device 102 also includes a scanning device 146 for scanning energy beam 114 over selective portions of build material 110. In the example embodiment, scanning device 146 includes one or more galvanometer optical scanners configured to direct energy beam 114 over selective portions of build material 110, as described in more detail below. In alternative embodiments, scanning device 146 may include one or more motorized mirrors, lenses and/or other optical devices configured to direct energy beam 114 over selective portions of build material 110.

One or more of build platform 104, build material dispenser 124, scanning device 146, energy source 112, imaging devices 126, 128, and 130, and visible light sources 132 and 134 may be optionally connected to a controller 148 which controls one or more parameters (e.g., position, energy intensity, etc.) of the devices connected thereto. In the example embodiment, scanning device 146, energy source 112, and build material dispenser 124 are connected to controller 148. Also in the example embodiment, controller 148 is connected to computing device 200. In alternative embodiments, controller 148 may be connected to a separate computing device (not shown), controller 148 may have an integrated computing device (not shown) or controller 148 may not be connected to a computing device.

Figure 2:
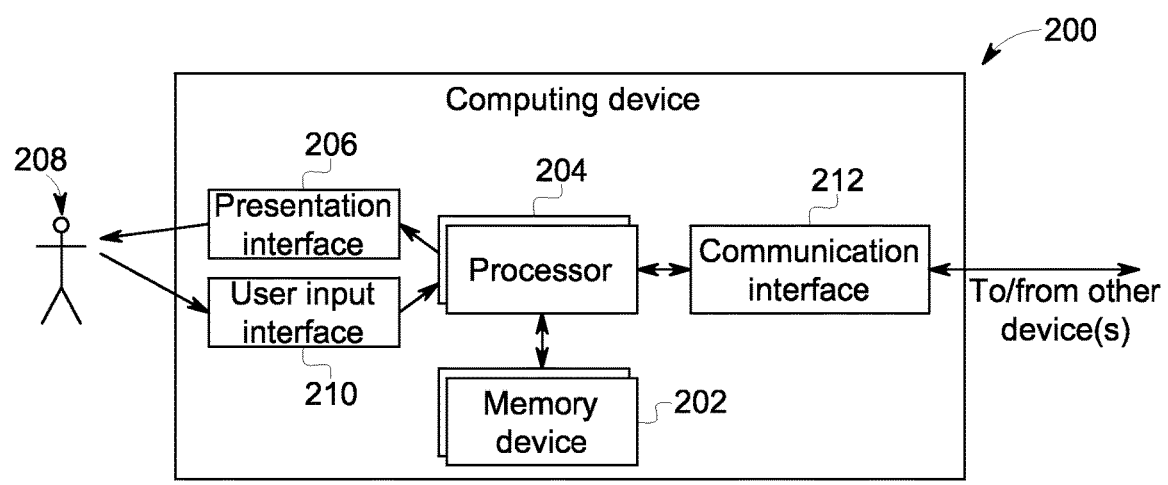
FIG. 2 is a block diagram of the computing device shown in FIG. 1.

Referring now to FIG. 2, computing device 200 includes a memory device 202 and a processor 204 operatively coupled to memory device 202 for executing instructions, storing processed data received from one or more devices, such as imaging devices 126, 128, and 130, and retrieving data and/or executable instructions stored in memory device 202. Processor 204 may include one or more processing units (e.g., in a multi-core configuration). Computing device 200 is configurable to perform one or more operations described herein by programming processor 204. For example, processor 204 may be programmed by encoding an operation as one or more executable instructions and providing the executable instructions in memory device 202.

In the example embodiment, memory device 202 is one or more devices that enable storage and retrieval of information such as executable instructions and/or other data. Memory device 202 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are examples only, and are thus not limiting as to the types of memory usable for storage of a computer program.

In the example embodiment, memory device 202 is configured to store data associated with layers 116, 118, and 120 and/or component 106. More specifically, memory device 202 is configured to store measurement data associated with one or more geometric characteristics of one or more layers 116, 118, and 120 and/or component 106. As used herein, the term "geometric characteristic" is intended to be representative of any characteristic of a layer 116, 118, and 120 and/or component 106 related to the physical size, shape, orientation, and position of a layer 116, 118, and 120 and/or component 106, such as the length, width, thickness, shape, size, relative position, and/or relative orientation of a layer 116, 118, and 120. The above geometric characteristics are examples only, and are thus not limiting as to the types of geometric characteristics which may be stored by memory device 202.

In some embodiments, computing device 200 includes a presentation interface 206 coupled to processor 204. Presentation interface 206 presents information, such as a user interface, to a user 208. In one embodiment, presentation interface 206 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 206 includes one or more display devices. In addition, or alternatively, presentation interface 206 includes an audio output device (not shown) (e.g., an audio adapter and/or a speaker) and/or a printer (not shown).

In some embodiments, computing device 200 includes a user input interface 210. In the example embodiment, user input interface 210 is coupled to processor 204 and receives input from user 208. User input interface 210 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 206 and user input interface 210.

A communication interface 212 is coupled to processor 204 and is configured to be coupled in communication with one or more other devices, such as imaging devices 126, 128, and 130, controller 148, energy source 112, or another computing device (not shown), and to perform input and output operations with respect to such devices. For example, communication interface 212 may include, without limitation, a wired network adapter, a wireless network adapter, a mobile telecommunications adapter, a serial communication adapter, and/or a parallel communication adapter. Communication interface 212 may receive data from and/or transmit data to one or more remote devices. Communication interface 212 facilitates machine-to-machine communications, i.e., acts as a machine-to-machine interface.

Presentation interface 206 and/or communication interface 212 are both capable of providing information suitable for use with the methods described herein (e.g., to user 208 or another device). Accordingly, presentation interface 206 and communication interface 212 may be referred to as output devices. Similarly, user input interface 210 and communication interface 212 are capable of receiving information suitable for use with the methods described herein and may be referred to as input devices.

In operation, additive manufacturing system 100 is used to fabricate a three-dimensional component 106 by a layer-by-layer manufacturing process. More specifically, additive manufacturing device 102 is configured to fabricate component 106 by sequentially forming a plurality of superposed layers 116, 118, and 120 based upon a digital representation 300 of a component, shown in FIG. 3.

Digital representation 300 includes a plurality of segments 302, 304, and 306. In the embodiment illustrated in FIG. 3, segments 302, 304, and 306 are represented by digital two-dimensional cross-sections, also labeled 302, 304, and 306, each corresponding to at least one layer 116, 118, and 120 of component 106. Each digital two-dimensional cross-section 302, 304, and 306 is defined by a plurality of points or vertices, which also define the peripheral edges of digital two-dimensional cross-sections 302, 304, and 306. More specifically, first digital two-dimensional cross-section 302 is defined by vertices 308, 310, 312, and 314. Vertices 308 and 310 define a first peripheral edge 316 of first digital two-dimensional cross-section 302. Vertices 310 and 312 define a second peripheral edge 318 of first digital two-dimensional cross-section 302. Vertices 312 and 314 define a third peripheral edge 320 of first digital two-dimensional cross-section 302. Vertices 314 and 308 define a fourth peripheral edge 322 of first digital two-dimensional cross-section 302. Second digital two-dimensional cross-section 304 is defined by vertices 324, 326, 328, and 330. Vertices 324 and 326 define a fifth peripheral edge 332 of second digital two-dimensional cross-section 304. Vertices 326 and 328 define a sixth peripheral edge 334 of second digital two-dimensional cross-section 304. Vertices 328 and 330 define a seventh peripheral edge 336 of second digital two-dimensional cross-section 304. Vertices 330 and 324 define an eighth peripheral edge 338 of second digital two-dimensional cross-section 304. Third digital two-dimensional cross-section 306 is defined by vertices 340, 342, 344, and 346. Vertices 340 and 342 define a ninth peripheral edge 348 of third digital two-dimensional cross-section 306. Vertices 342 and 344 define a tenth peripheral edge 350 of third digital two-dimensional cross-section 306. Vertices 344 and 346 define an eleventh peripheral edge 352 of third digital two-dimensional cross-section 306. Vertices 346 and 340 define a twelfth peripheral edge 354 of third digital two-dimensional cross-section 306.

Digital representation 300, segments 302, 304, and 306, and/or vertices 308, 310, 312, 314, 324, 326, 328, 330, 340, 342, 344, and 346 are stored in memory device 202 of computing device 200. Processor 204 is configured to retrieve digital representation 300, segments 302, 304, and 306, and/or vertices 308, 310, 312, 314, 324, 326, 328, 330, 340, 342, 344, and 346 during fabrication of component 106.

Figure 4:
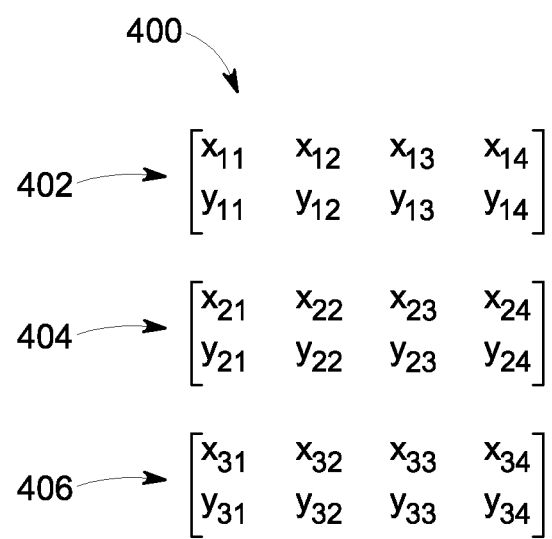
FIG. 4 is a representative illustration of a data object defining the digital representation shown in FIG. 3.

FIG. 4 is a representative illustration of a data object 400 defining digital representation 300 stored in memory device 202. Data object 400 includes a plurality of matrices 402, 404, and 406 corresponding to digital two-dimensional cross-sections 302, 304, and 306, respectively. Each matrix 402, 404, and 406 includes a plurality of coordinate points defining vertices of digital two-dimensional cross-sections 302, 304, and 306 in a reference coordinate system (such as coordinate system 1116 described below with reference to FIG. 11). More specifically, each vertex of a digital two-dimensional cross-section is represented by an x-coordinate value, denoted as $x_{ij}$, and a y-coordinate value, denoted as $x_{ij}$, where "i" denotes one of n digital two-dimensional cross-sections of digital representation 300, and "j" denotes one of k vertices defining the $i^{th}$ digital two-dimensional cross-section. Accordingly, matrix 402 corresponds to first digital two-dimensional cross-section 302, matrix 404 corresponds to second digital two-dimensional cross-section 304, and matrix 406 corresponds to third digital two-dimensional cross-section 306. The vertices of each digital two-dimensional cross-section 302, 304, and 306 may be numbered in any suitable manner that enables additive manufacturing system 100 and/or computing device 200 to function as descried herein. In the embodiment illustrated in FIG. 4, vertices 308, 324 and 340 are denoted as the first vertex of respective digital two-dimensional cross-sections 302, 304, and 306, and the remaining vertices of each digital two-dimensional cross-section 302, 304, and 306 are numbered sequentially in a counter-clockwise direction (i.e., vertex 310 is represented by coordinate point $(x_{12}, y_{12})$, vertex 312 is represented by coordinate point $(x_{13}, y_{13})$, and so on). In alternative embodiments, digital representation 300 and/or digital two-dimensional cross-sections 302, 304, and 306 may be stored in memory device 202 using any other suitable data object or format that enables additive manufacturing system 100 and/or computing device 200 to function as descried herein.

In the example embodiment, to form a layer 116, 118, or 120 of component 106, computing device 200 communicates with controller 148 via processor 204 and/or communication interface 212, and controller 148 controls scanning device 146 and/or energy source 112 to direct energy beam 114 over selective portions of build material 110 according to a digital two-dimensional cross-section 302, 304, or 306 corresponding to a layer 116, 118, or 120 being formed. Energy beam 114 is of sufficient intensity to solidify build material 110. Once a layer 116, 118, or 120 is formed, build platform 104 is lowered and a layer of unsolidified build material is provided over the previously formed layer. In the example embodiment, build material dispenser 124 is used to place a layer of unsolidified build material over the previously formed layer. In alternative embodiments, such as systems using liquid resin (e.g., stereolithography devices), a layer of unsolidified resin is provided over the previously formed layer by lowering build platform 104 and allowing the liquid resin to flow over the previously formed layer. The above steps are repeated until all layers 116, 118, and 120 of component 106 have been formed.

Figure 3:
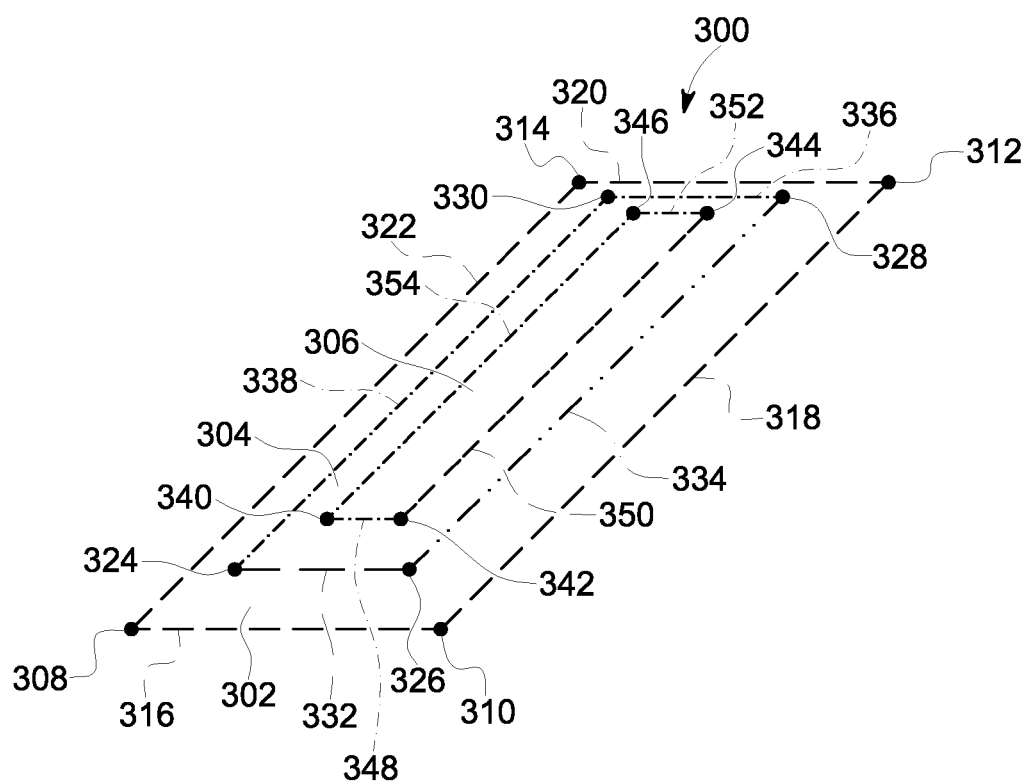
FIG. 3 is a graphical representation of an uncompensated digital representation used to fabricate a component.

The digital representation 300 illustrated in FIG. 3 is an uncompensated digital representation. More specifically, digital representation 300 has virtually identical geometric characteristics to a desired component 2600 (shown in FIG. 26) to be fabricated by additive manufacturing system 100. However, as layers 116, 118, and 120 of component 106 reach thermal and mechanical equilibrium after formation, one or more geometric characteristics of layers 116, 118 and 120 may change from the initial, or nominal, geometric characteristic of the layer at the time it was formed. As a result, component 106 fabricated according to uncompensated digital representation 300 has different geometric characteristics than digital representation 300 once component 106 reaches thermal and mechanical equilibrium.

Figure 5:
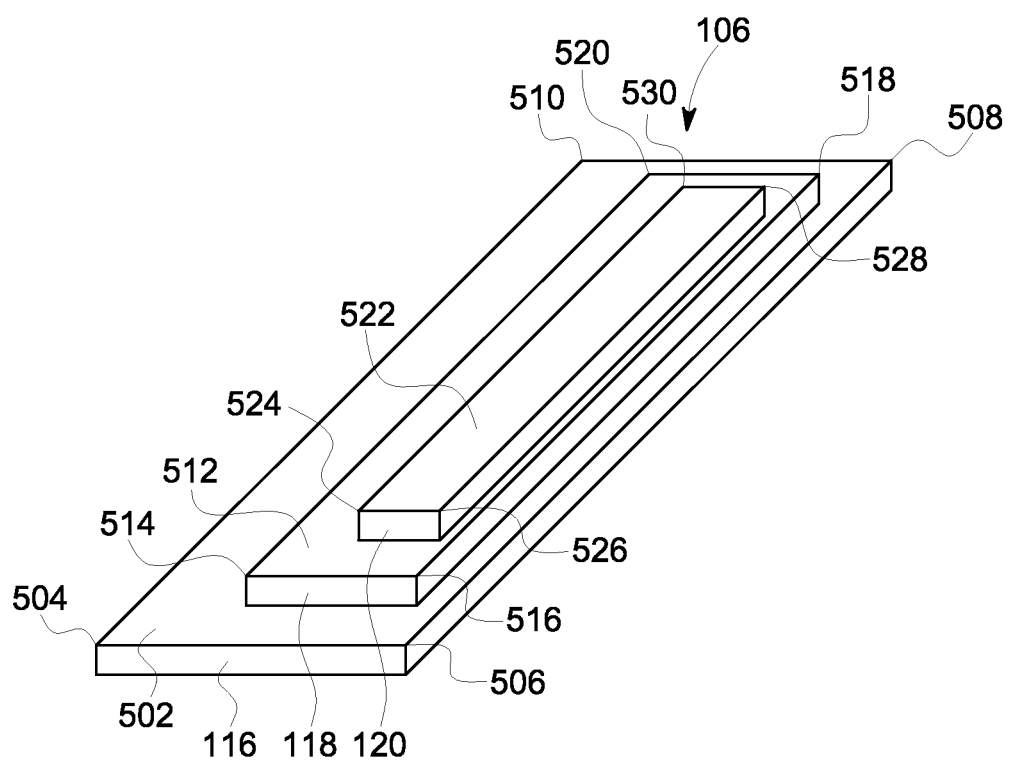
FIG. 5 is a perspective view of a component fabricated according to the uncompensated digital representation shown in FIG. 3.

FIG. 5 is a perspective view of component 106 fabricated according to uncompensated digital representation 300. Each layer 116, 118, and 120 of component 106 includes an upper surface defined by vertices. More specifically, first layer 116 includes a first upper surface 502 defined by vertices 504, 506, 508, and 510. Second layer 118 includes a second upper surface 512 defined by vertices 514, 516, 518, and 520. Third layer 120 includes a third upper surface 522 defined by vertices 524, 526, 528, and 530. As shown in FIG. 5, the relative position of each layer 116, 118, and 120 of component 106 is different than the relative positions of corresponding digital two-dimensional cross-sections 302, 304, and 306 as a result of layers 116, 118, and 120 shifting after formation.

Figure 6:
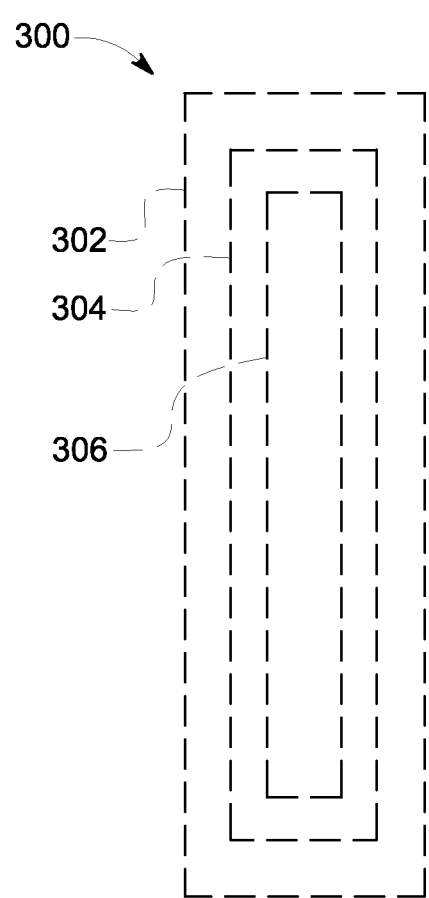
FIG. 6 is a top view of the uncompensated digital representation shown in FIG. 3.
Figure 7:
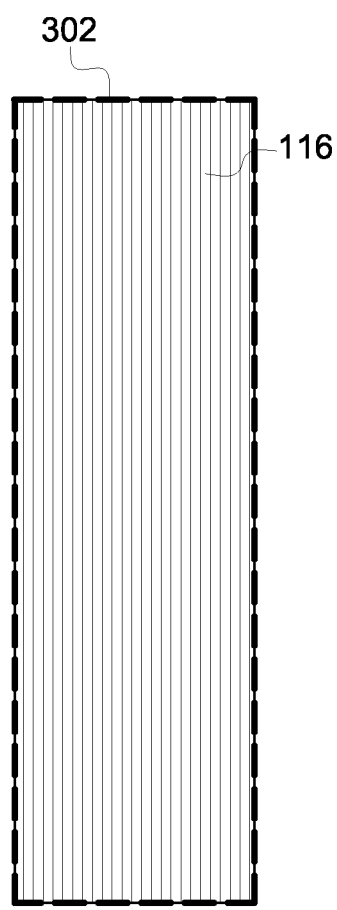
FIGS. 7-10 are top views of the component shown in FIG. 5 at different times during the process of fabricating the component.
Figure 8:
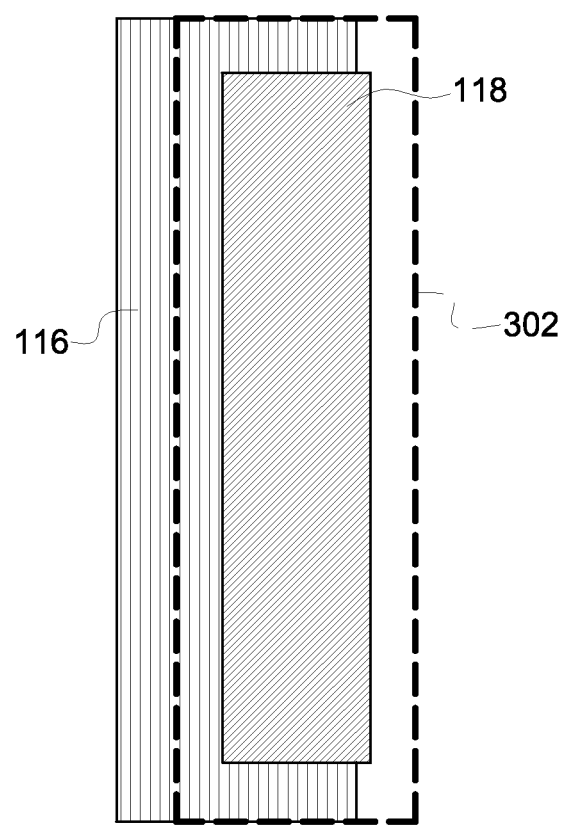
Figure 9:
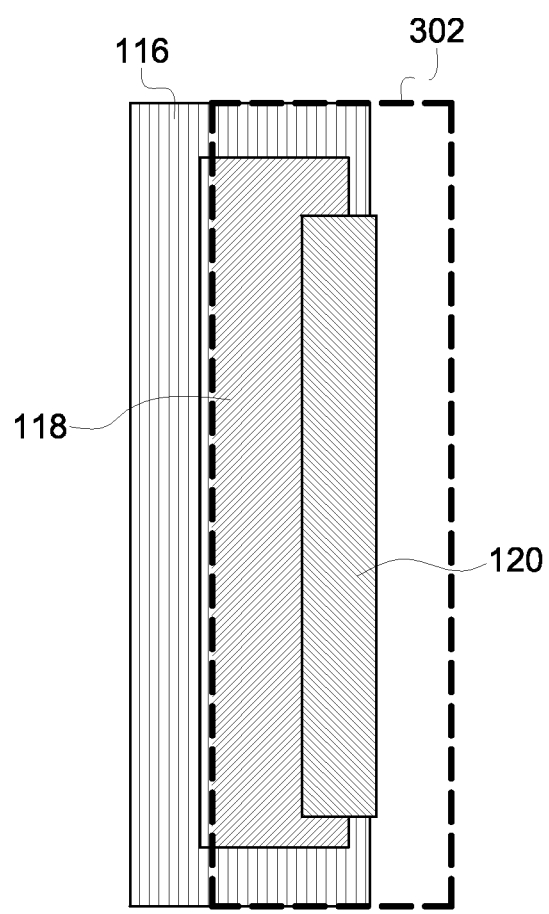
Figure 10:
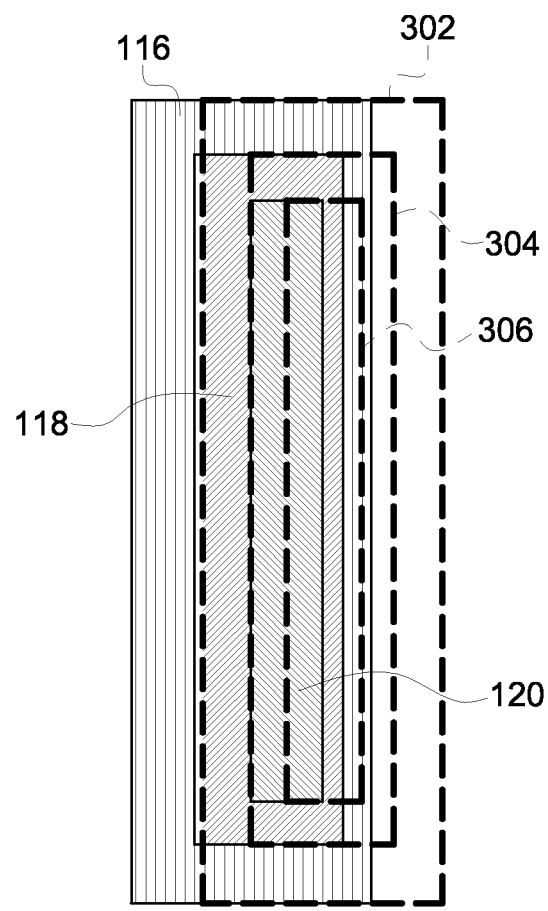

FIG. 6 is a top view of digital representation 300, and FIGS. 7-10 are top views of component 106 at different times during a process of forming component 106 according to uncompensated digital representation 300. First digital two-dimensional cross-section 302 is shown in FIGS. 7-10 for illustration. Referring to FIG. 7, a first layer 116 is formed according to first digital two-dimensional cross-section 302 corresponding to first layer 116. Referring to FIG. 8, after first layer 116 is formed, a second layer 118 is formed on top of first layer 116 according to second digital two-dimensional cross-section 304 corresponding to second layer 118. As shown in FIG. 8, at the time second layer 118 is formed, first layer 116 has shifted relative to its initial position. As a result, the relative position of second layer 118 compared to first layer 116 is different than the relative positions of corresponding first and second digital two-dimensional cross-sections 302 and 304 of uncompensated digital representation 300. Referring to FIG. 9, a third layer 120 is subsequently formed on top of second layer 118 according to third digital two-dimensional cross-section 306. As shown in FIG. 9, at the time third layer 120 is formed, first layer 116 has shifted from its position at the time second layer 118 was formed, and second layer 118 has shifted from its an initial position relative to first layer 116. Referring to FIG. 10, as layers 116, 118, and 120 of component 106 reach thermal and mechanical equilibrium after formation, first, second, and third layers 116, 118, and 120 continue to shift position relative to one another.

Figure 11:
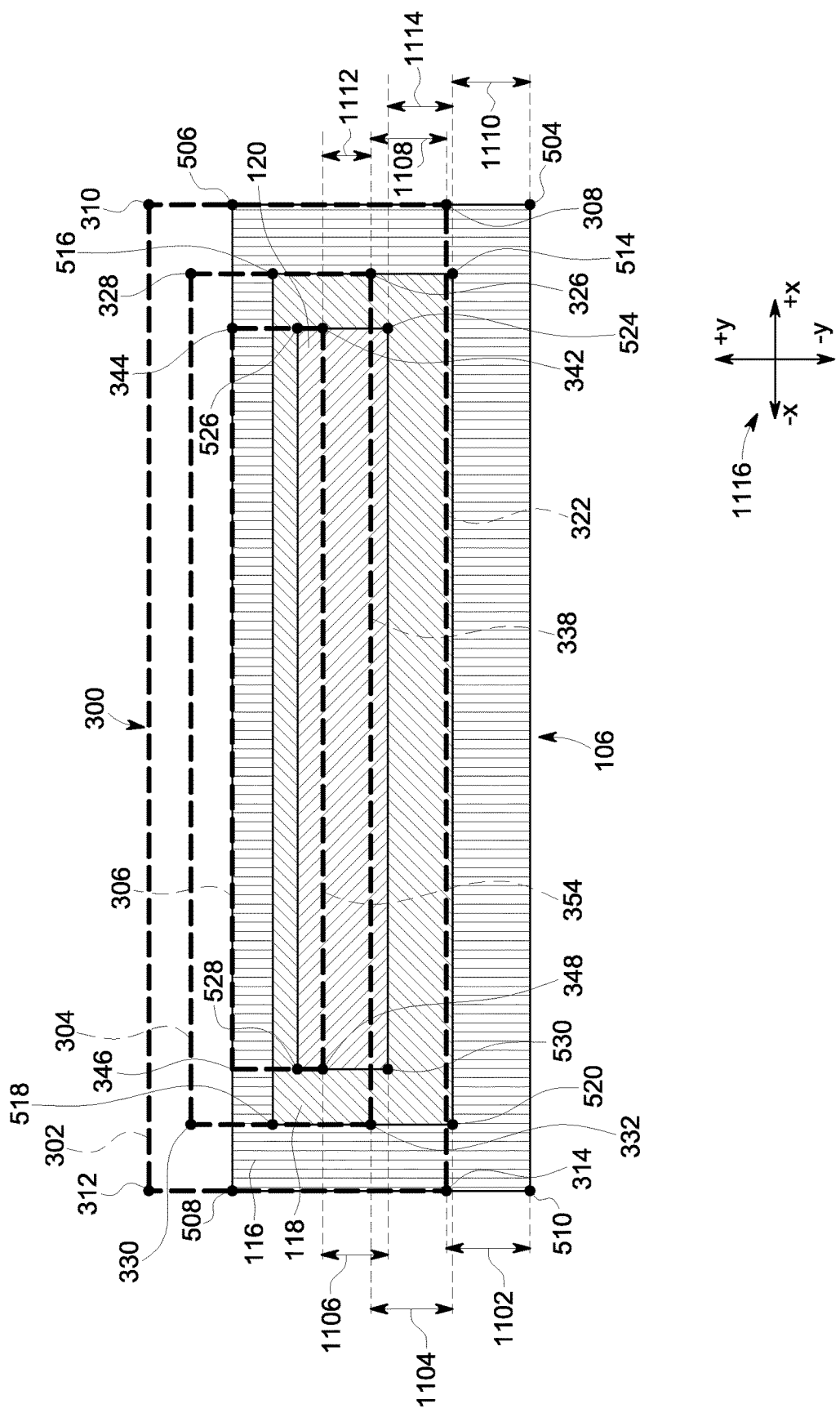
FIG. 11 is an enlarged view of FIG. 10.

FIG. 11 is an enlarged top view of component 106 after layers 116, 118, and 120 have reached thermal and mechanical equilibrium. Digital two-dimensional cross-sections 302, 304, and 306 of uncompensated digital representation 300 corresponding to first, second and third layers 116, 118, and 120 are shown in dashed lines for illustration. As shown in FIG. 11, first layer 116 is offset from its nominal position by a distance 1102. Similarly, second layer 118 is offset from its nominal position by a distance 1104, and third layer 120 is offset from its nominal position by a distance 1106. Further, the position of second layer 118 relative to first layer 116 is different than corresponding digital two-dimensional cross-sections 302 and 304 of uncompensated digital representation 300. More specifically, the distance 1108 between fourth peripheral edge 322 and eighth peripheral edge 338 is different than the distance 1110 between corresponding edges of first and second layers 116 and 118. Similarly, the position of third layer 120 relative to second layer 118 is different than corresponding digital two-dimensional cross-sections 304 and 306 of uncompensated digital representation 300. More specifically, the distance 1112 between eighth peripheral edge 338 and twelfth peripheral edge 354 is different than the distance 1114 between corresponding edges of second and third layers 118 and 120.

Figure 25:
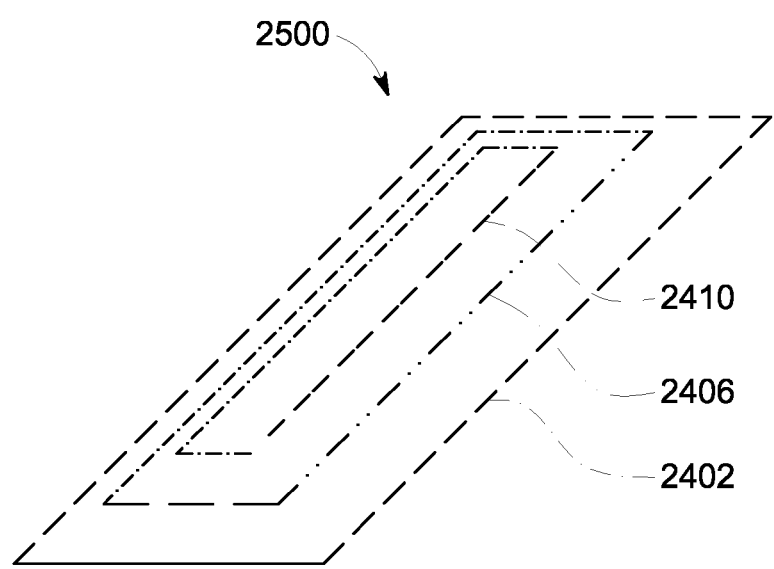
FIG. 25 is a graphical representation of a compensated digital representation used to fabricate a desired component.
Figure 26:
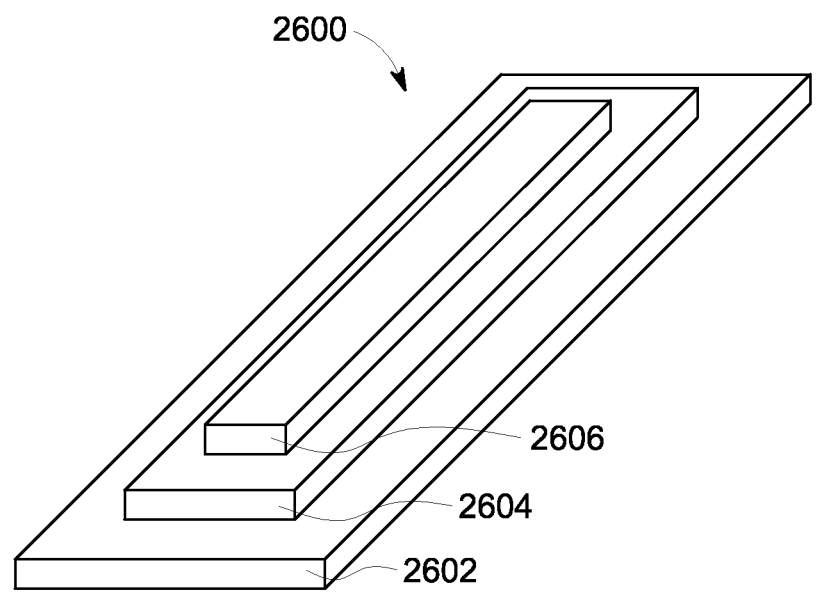
FIG. 26 is a perspective view of a desired component fabricated according to the compensated digital representation shown in FIG. 25.

Computing device 200 and one or more imaging devices 126, 128, and 130 are configured to measure, record, compute, and/or store differences between a geometric characteristic of each layer 116, 118, and 120 and a corresponding geometric characteristic of digital two-dimensional cross-sections 302, 304, and 306 corresponding to layers 116, 118, and 120, and generate a compensated digital representation 2500 (shown in FIG. 25) of desired component 2600 to be fabricated based on the differences (shown in FIG. 26). Computing device 200 may be pre-programmed with a reference coordinate system, such as the coordinate system 1116 shown in FIG. 11, to facilitate generating a compensated digital representation 2500 of desired component 2600. In the embodiment illustrated in FIG. 11, coordinate system 1116 is defined by x- and y-axes having positive and negative directions, indicated by "+" and "−" signs, respectively. Coordinate system 1116 may use one or more elements of additive manufacturing device 102 as a reference point, such as build platform 104. In alternative embodiments, computing device 200 is not pre-programmed with a reference coordinate system. In such embodiments, computing device may be configured to define a coordinate system and/or to allow a user 208 to define a coordinate system before or during an additive manufacturing process.

Figure 12:
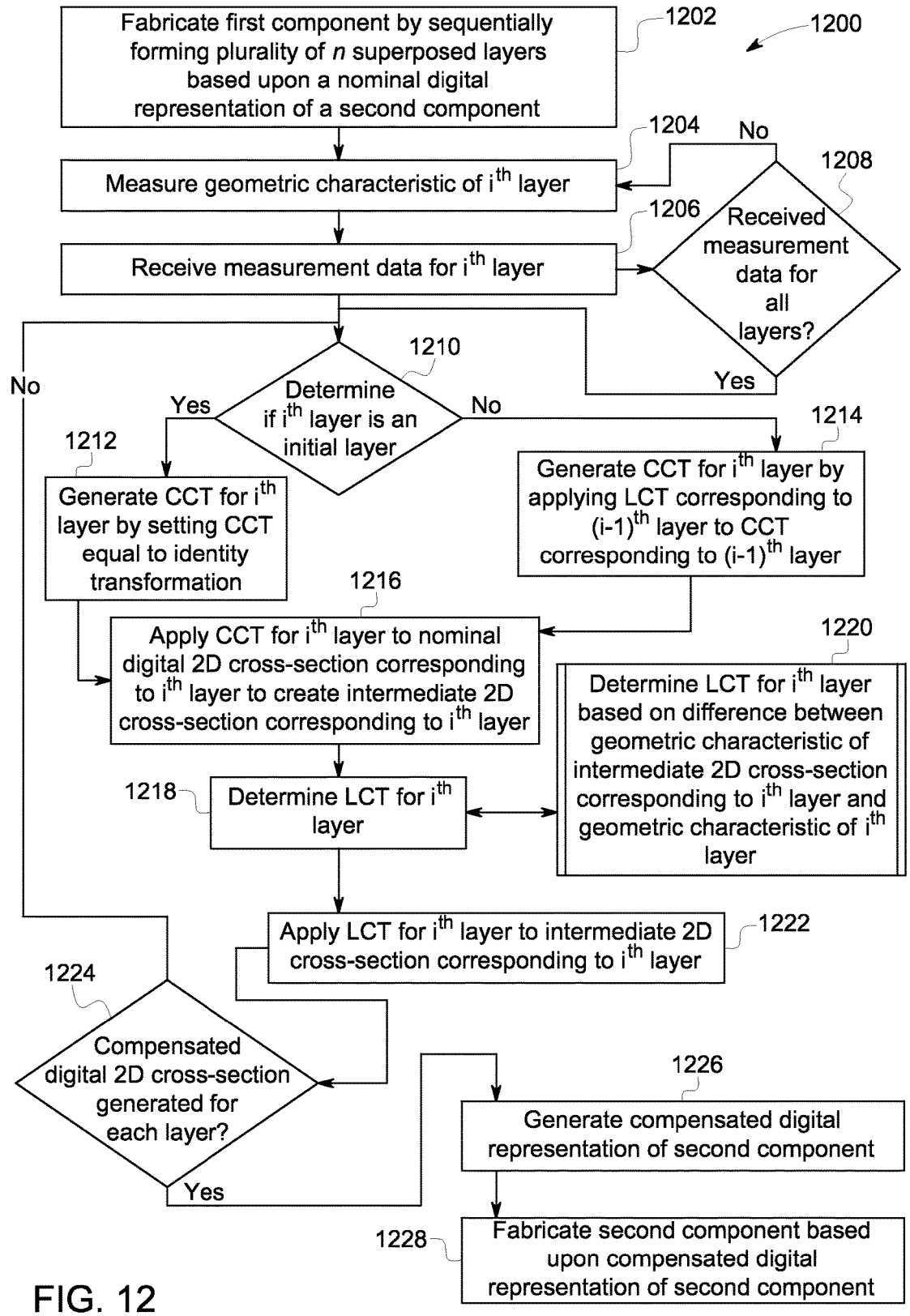
FIG. 12 is a flow chart of an example method of fabricating a component using an additive manufacturing process.
Figure 22:
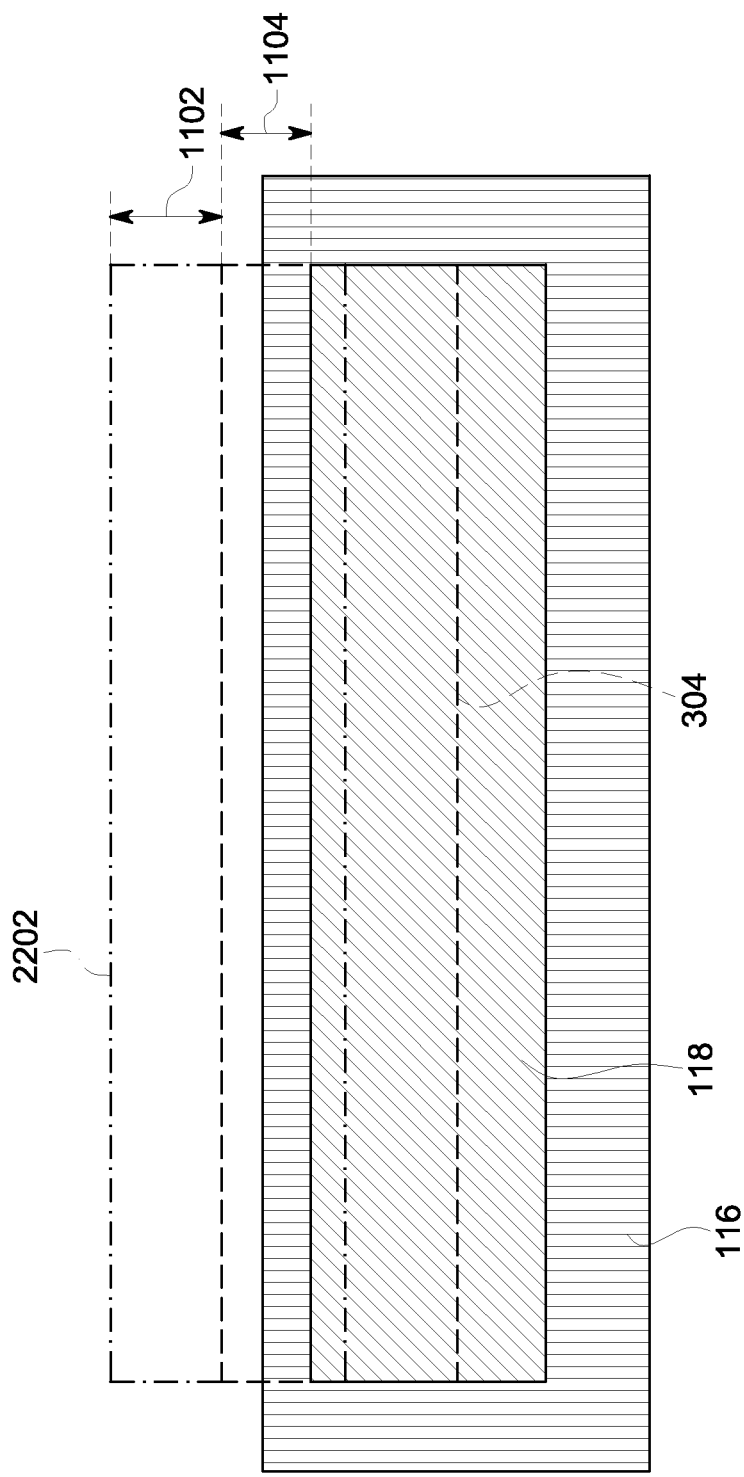
FIG. 22 is a graphical representation of a digital two-dimensional cross-section associated with a second layer of the component shown in FIG. 3, and a corresponding intermediate digital two-dimensional cross-section.
Figure 23:
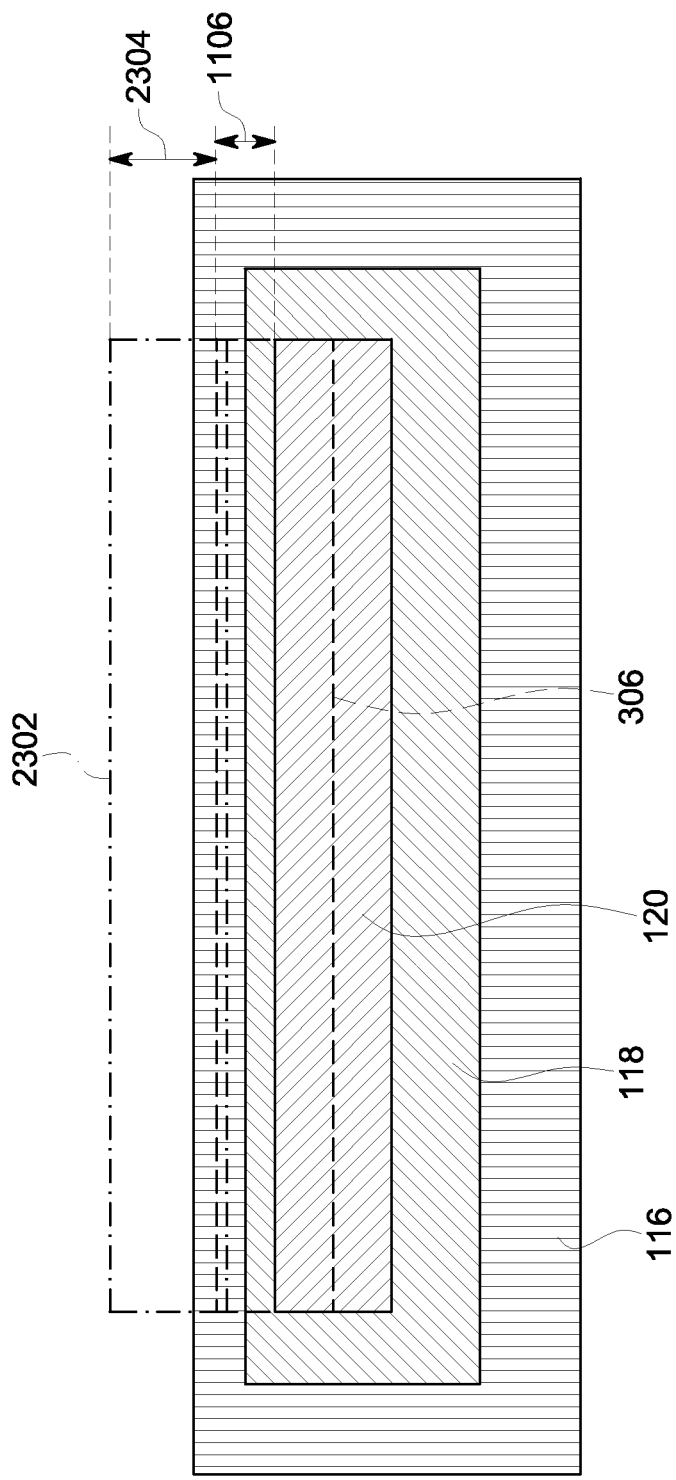
FIG. 23 is a graphical representation of a digital two-dimensional cross-section associated with a third layer of the component shown in FIG. 3, and a corresponding intermediate digital two-dimensional cross-section.
Figure 24:
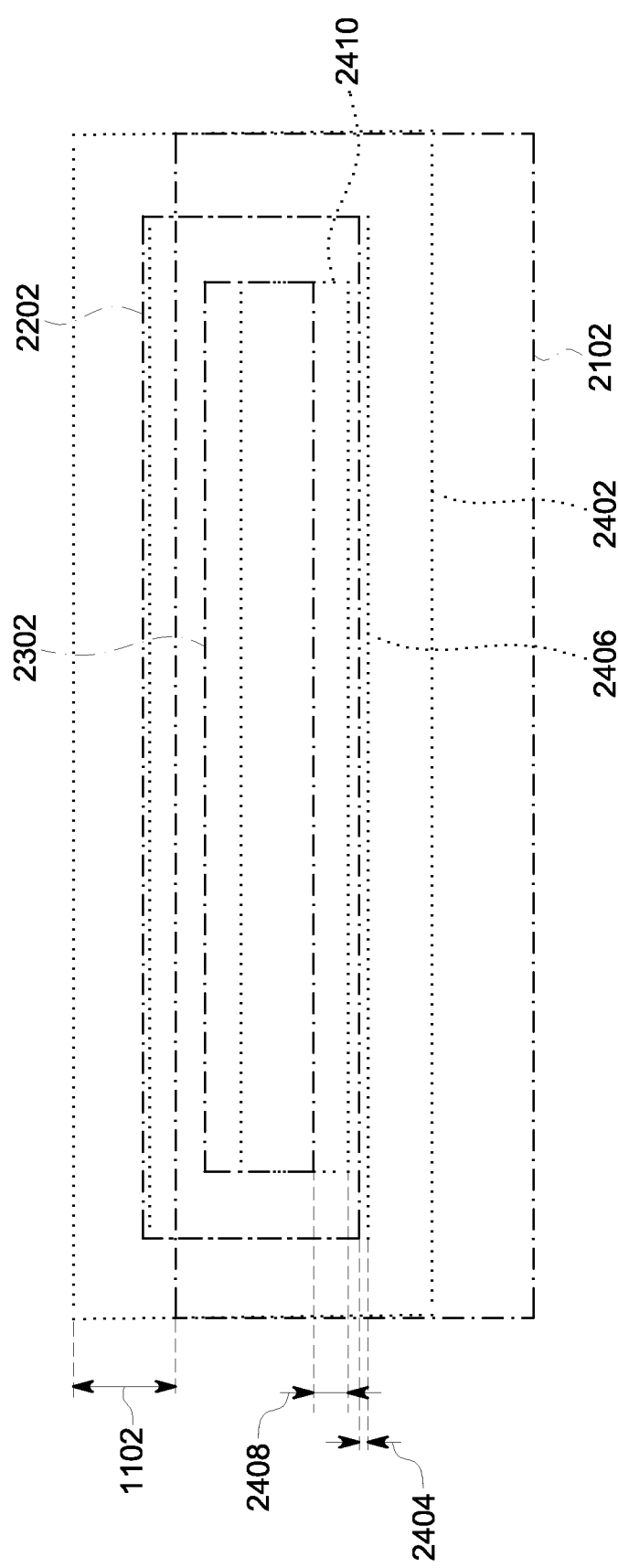
FIG. 24 is a graphical representation of compensated digital two-dimensional cross-sections associated with first, second, and third layers of the component shown in FIG. 3.

Referring to FIG. 12, a flowchart of an example method of fabricating a component using an additive manufacturing process is shown generally at 1200. Throughout the description of method 1200, reference is made to FIGS. 21-24 which graphically illustrate the transformation of nominal digital two-dimensional cross-sections to intermediate digital two-dimensional cross-sections (FIGS. 21-23), and the transformation of intermediate digital two-dimensional cross-sections to compensated digital two-dimensional cross-sections (FIG. 24).

A first component, such as component 106 (shown in FIGS. 1 and 5) is fabricated 1202 by sequentially forming a plurality of n superposed layers, such as layers 116, 118 and 120, based upon a nominal digital representation of a second component, such as uncompensated digital representation 300. In the embodiment illustrated in FIGS. 1 and 5, n equals three as component 106 is formed of three layers 116, 118, and 120. The nominal digital representation includes a plurality of nominal digital two-dimensional cross-sections, such as digital two-dimensional cross-sections 302, 304, and 306, each corresponding to a layer of the first component.

Optionally, each layer of the first component may be assigned a unique reference numeral (represented by i in FIG. 12) by computing device 200 to facilitate carrying out the methods described herein. For example, each layer 116, 118, and 120 of component 106 may be assigned a unique reference numeral between one and n, which in the embodiment shown in FIGS. 1 and 5 is three. First layer 116 may be assigned a reference numeral of one, second layer 118 may be assigned a reference numeral of two, and third layer 120 may be assigned a reference numeral of three. Alternatively, the order of reference numerals may be reversed such that third layer 120 is assigned a reference numeral of one, and first layer 116 is assigned a reference numeral of three.

For each layer of the first component, using, for example, computing device 200 and one or more imaging devices 126, 128, and 130, a geometric characteristic of each layer is measured 1204 after the layer is formed, and measurement data is sent to and received 1206 by computing device 200 based on measurements of geometric characteristics of the n layers. In the embodiment illustrated in FIG. 12, measurement data is received 1208 for all n layers of the first component before subsequent steps of method 1200 are carried out. In alternative embodiments, subsequent steps of method 1200 may be carried out before measurement data is received for all n layers of the first component. Measurement data is stored in memory device 202 such that measurement data can be retrieved and processed by processor 204.

FIG. 13 is a representative illustration of measurement data 1300 received by computing device 200. Measurement data 1300 includes a plurality of coordinate points corresponding to the vertices or corners of a formed layer formed by the intersection of two or more surfaces or edges of the formed layer. In measurement data 1300 illustrated in FIG. 13, each vertex or corner of a formed layer is represented by an x-coordinate value, denoted as $a_{ij}$, and a y-coordinate value, denoted as $b_{ij}$, where "i" denotes one of n layers of a component, such as component 106, and "j" denotes one of k vertices or corners defining the $i^{th}$ layer of the component.

Figure 14:
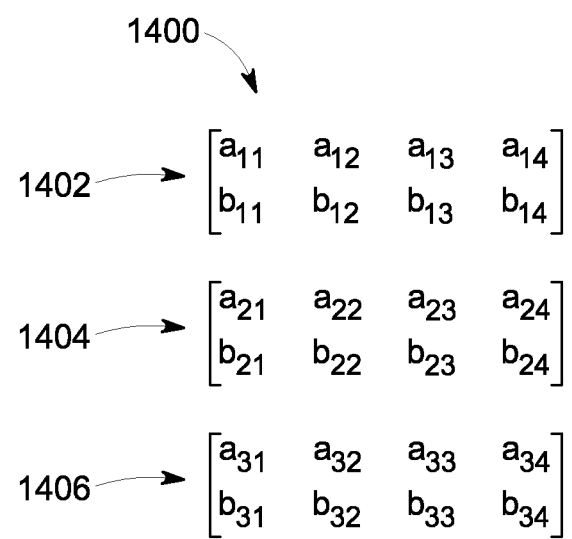
FIG. 14 is a representative illustration of a measurement data set corresponding to the component illustrated in FIG. 5.

FIG. 14 is a representative illustration of a measurement data set 1400 for component 106 received by computing device 200 and stored in memory device 202. Measurement data set 1400 includes first measurement data 1402 corresponding to first layer 116, second measurement data 1404 corresponding to second layer 118, and third measurement data 1406 corresponding to third layer 120. The vertices of each layer 116, 118, and 120 may be numbered in any suitable manner than enables additive manufacturing system 100 and/or computing device 200 to function as descried herein. In the embodiment illustrated in FIG. 14, vertices 504, 514, and 524 are denoted as the first vertices of respective layers 116, 118, and 120, and the remaining vertices of each layer 116, 118, and 120 are numbered sequentially in a counter-clockwise direction (i.e., vertex 506 is represented by coordinate point ($a_{12}$, $b_{12}$), vertex 508 is represented by coordinate point ($a_{13}$, $b_{13}$), and so on). In alternative embodiments, measurement data 1300 and/or measurement data set 1400 may be stored in memory device 202 using any other suitable format that enables additive manufacturing system 100 and/or computing device 200 to function as descried herein.

Before or during method 1200, the format in which digital representation 300, digital two-dimensional cross-sections 302, 304, and 306, measurement data 1300, and/or measurement data set 1400 are stored in memory device 202 may be transformed to facilitate performing one or more transformative functions described below. For example, referring to FIG. 15, each digital two-dimensional cross-section 302, 304, and 306 and measurement data set 1400, may be transformed into a corresponding tensor matrix to facilitate performing one or more transformative functions described below. More specifically, first tensor matrix 1502 corresponds to first digital two-dimensional cross-section 302, second tensor matrix 1504 corresponds to second digital two-dimensional cross-section 304, third tensor matrix 1506 corresponds to third digital two-dimensional cross-section 306, fourth tensor matrix 1508 corresponds to first measurement data 1402, fifth tensor matrix 1510 corresponds to second measurement data 1404, and sixth tensor matrix 1512 corresponds third measurement data 1406.

Referring again to FIG. 12, once measurement data is received 1206 for one or more layers of first component, a cumulative compensation transformation (CCT) is generated using, for example, computing device 200, for each layer of first component. More specifically, a CCT is generated for each $i^{th}$ layer of the first component. As used herein, the term "cumulative compensation transformation" is intended to be representative of any transformative object or function, such as a scalar, vector, a rotation matrix, a translation matrix, a full transformation matrix, a transformational field, or a deformational field, and any combination thereof, configured to transform a digital two-dimensional cross-section of a digital representation by the total, or cumulative, compensation transformations applied to all preceding digital two-dimensional cross-sections during method 1200.

In the example embodiment, i is initially set to one such that the first CCT generated corresponds to the layer of the first component assigned a reference numeral of one. Furthermore, in the example embodiment, the manner in which a CCT is generated depends upon whether the $i^{th}$ layer is an initial layer. A layer is an "initial layer" if no CCTs have been generated for or applied to a preceding layer during method 1200. In the example embodiment, the initial layer corresponds to the layer assigned the reference numeral one (i.e., i=1). A determination is made 1210 whether the $i^{th}$ layer is an initial layer. If the $i^{th}$ layer is an initial layer, the CCT is generated 1212 by setting the CCT equal to an identity transformation (i.e., a transformative object or function which, when applied to a digital two-dimensional cross-section returns the same, or identical, digital two-dimensional cross-section).

FIG. 16 is a representative illustration of a first CCT 1602 associated with first layer 116 of component 106. As shown in FIG. 16 first CCT 1602 is a 12×12 identity matrix. In alternative embodiments, first CCT 1602 may have any suitable dimensions that enable additive manufacturing system 100 and/or computing device 200 to function as described herein. When first CCT 1602 is applied to first tensor matrix 1502 corresponding first digital two-dimensional cross-section 302, the resulting value, referred to as seventh tensor matrix 1604, is identical to first tensor matrix 1502.

If the $i^{th}$ layer is not an initial layer, the CCT is generated 1214 by applying the local transformation compensation (LCT) corresponding to the $(i-1)^{th}$ layer (described in more detail below) to the CCT corresponding to the $(i-1)^{th}$ layer. The resulting transformation is the CCT for the $i^{th}$ layer. The $(i-1)^{th}$ refers to the preceding layer for which a CCT and LCT were generated and/or determined. The $(i-1)^{th}$ is not limited to a layer physically located under or below the $i^{th}$ layer. In some embodiments, the $(i-1)^{th}$ layer may refer to a layer physically located above the $i^{th}$ layer, for example, where method 1200 is commenced with third layer 120 of component 106. Further, depending upon the methodology used to determine the LCT for the $(i-1)^{th}$ layer in alternative embodiments, the CCT may be generated 1214 by applying the inverse of the LCT corresponding to the $(i-1)^{th}$ layer to the CCT corresponding to the $(i-1)^{th}$ layer.

As used herein, the term "apply" and related terms, e.g., "applied", "applying", etc., may refer to any mathematical operation, and more specifically, any matrix operation, such as matrix addition, scalar multiplication, matrix multiplication, row addition, row multiplication, matrix subtraction, or any other mathematical operation suitable for transforming a digital two-dimensional cross-section by a corresponding compensation transformation and/or generating a compensation transformation. For example, where a compensation transformation is a vector or plurality of vectors, the compensation transformation may be applied to a digital two-dimensional cross-section by adding the vector or vectors to the points or vertices which make up the digital two-dimensional cross-section.

The CCT for the $i^{th}$ layer is applied 1216 to the nominal digital two-dimensional cross-section corresponding to the $i^{th}$ layer using, for example, computing device 200, to create an intermediate digital two-dimensional cross-section corresponding to the $i^{th}$ layer. Depending upon the methodology used to determine the CCT for the $i^{th}$ layer in alternative embodiments, the CCT may be applied 1216 by applying the inverse of the CCT for the $i^{th}$ layer to the nominal digital two-dimensional cross-section corresponding to the $i^{th}$ layer. In yet further alternative embodiments, only a portion of the CCT for the $i^{th}$ layer is applied to the nominal digital two-dimensional cross-section corresponding to the $i^{th}$ layer. In such embodiments, the CCT for the $i^{th}$ layer may be reduced by a time-dependent component to account for movement of previously formed layers which occurs before the $i^{th}$ layer is formed.

A local compensation transformation (LCT) is determined 1218 using, for example, computing device 200, for each layer of first component. More specifically, a LCT is determined 1218 for the $i^{th}$ layer of first component based upon a difference between corresponding vertices of the intermediate digital two-dimensional cross-section corresponding to the $i^{th}$ layer, and the $i^{th}$ layer of the first component. The vertices of the $i^{th}$ layer corresponding to the vertices of the intermediate digital two-dimensional cross-section corresponding to the $i^{th}$ layer may be determined, for example, by first identifying the vertices of the nominal digital two-dimensional cross-section corresponding to the $i^{th}$ layer that correspond to the vertices of the $i^{th}$ layer. The vertices of the intermediate digital two-dimensional cross-section for the $i^{th}$ layer (i.e., the vertices resulting from the application of the CCT for the $i^{th}$ layer to the nominal digital two-dimensional cross-section corresponding to the $i^{th}$ layer, described above) correspond to the same vertices of the $i^{th}$ layer to which the corresponding vertices of the nominal digital two-dimensional cross-section correspond to. The LCT is computed based upon a difference between the corresponding vertices. The term "local compensation transformation" is intended to be representative of any transformative object or function, such as a scalar, vector, a rotation matrix, a translation matrix, a full transformation matrix, a transformational field, a deformational field, and any combination thereof, configured to transform a digital two-dimensional cross-section of a digital representation by a value substantially equal to a localized difference between one or more geometric characteristics of an intermediate digital two-dimensional cross-section and a corresponding layer of a fabricated component, such as component 106. The LCT may thus be used to optimize a desired manufacturing or performance function such as dimensional accuracy, surface finishes, or material conditions.

Figure 21:
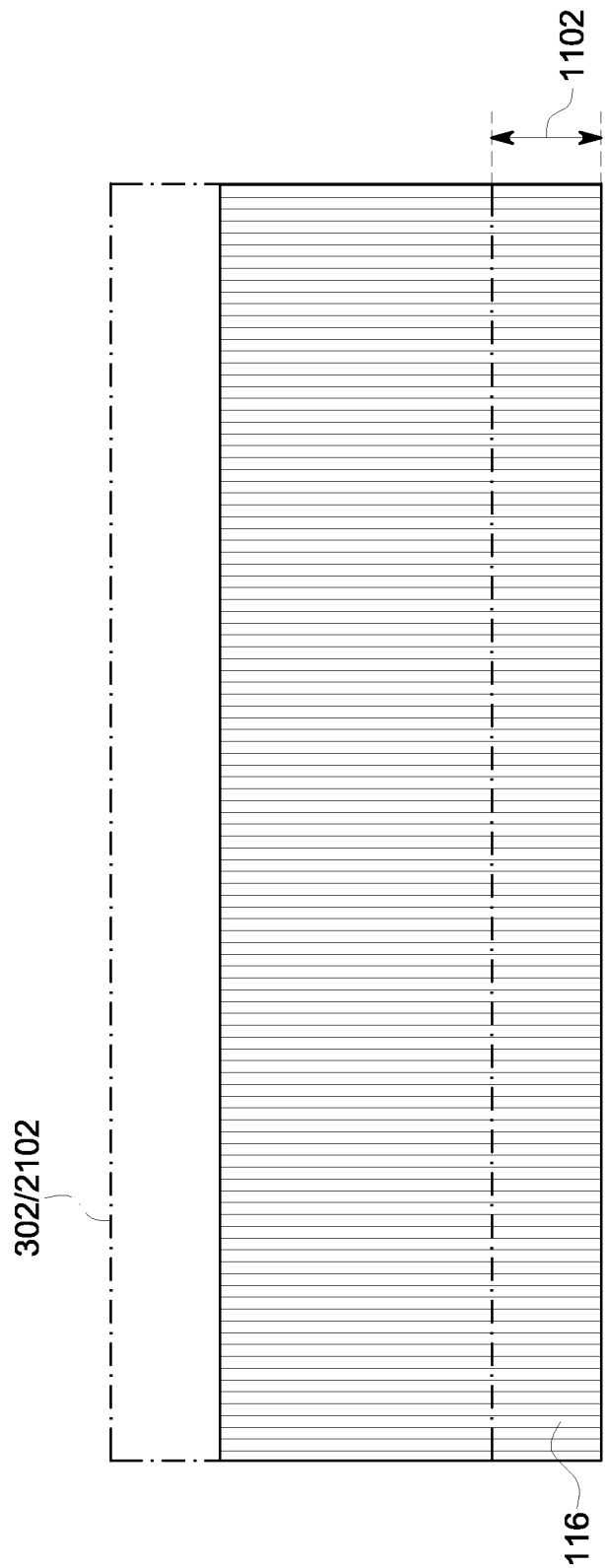
FIG. 21 is a graphical representation of a digital two-dimensional cross-section associated with a first layer of the component shown in FIG. 3, and a corresponding intermediate digital two-dimensional cross-section.

In the example embodiment, the LCT for the $i^{th}$ layer is determined 1220 based upon a difference between the geometric characteristic of the intermediate digital two-dimensional cross-section corresponding to the $i^{th}$ layer and the geometric characteristic of the $i^{th}$ layer of the first component. The difference between geometric characteristics used to determine the LCT for the $i^{th}$ layer may be a difference in size, shape, length, thickness, width, relative orientation, relative position, or any combination of the differences between these geometric characteristics. FIG. 17 is a representative illustration of a first LCT 1702 associated with first layer 116, determined by calculating the difference between a first intermediate digital two-dimensional cross-section 2102, represented by seventh tensor matrix 1604 and illustrated graphically in FIG. 21, and first layer 116, represented by fourth tensor matrix 1508. Specifically, the difference between seventh tensor matrix 1604 and fourth tensor matrix 1508 is determined. The resulting value, referred to as eighth tensor matrix 1704, is representative of the difference between a geometric characteristic of first intermediate digital two-dimensional cross-section 2102 and a corresponding geometric characteristic of first layer 116. Eighth tensor matrix 1704 may be used as the LCT for first layer 116 or, as shown in FIG. 17, first LCT 1702 may be generated by transforming eighth tensor matrix 1704 to have similar dimensions to other transformation matrices, such as first CCT 1602. As shown in FIGS. 11 and 21, each vertex of first layer 116 is offset from its corresponding vertex of first digital two-dimensional cross-section 302 by distance 1102 in the negative y-direction. Accordingly, first LCT 1702 is configured to compensate first intermediate digital two-dimensional cross-section 2102 by distance 1102 in the positive y-direction.

Referring again to FIG. 12, each LCT is applied 1222 to a corresponding intermediate digital two-dimensional cross-section using, for example, computing device 200, to create a compensated digital two-dimensional cross-section for each layer of the first component. More specifically, the LCT for the $i^{th}$ layer is applied 1222 to the intermediate digital two-dimensional cross-section corresponding to the $i^{th}$ layer to create a compensated digital two-dimensional cross-section corresponding to the $i^{th}$ layer.

For example, referring to FIG. 18, first LCT 1702 is applied to first intermediate digital two-dimensional cross-section 2102 by applying first LCT 1702 to seventh tensor matrix 1604. The resulting value, referred to as ninth tensor matrix 1802, is representative of the compensated digital two-dimensional cross-section corresponding to first layer 116 of component 106, referred to as first compensated digital two-dimensional cross-section 2402, illustrated graphically in FIG. 24. Depending upon the methodology used to determine the LCT for $i^{th}$ layer in alternative embodiments, the LCT may be applied 1222 to a corresponding intermediate digital two-dimensional cross-section by applying the inverse of the LCT for the $i^{th}$ layer to the intermediate digital two-dimensional cross-section corresponding to the $i^{th}$ layer.

Figure 19A:
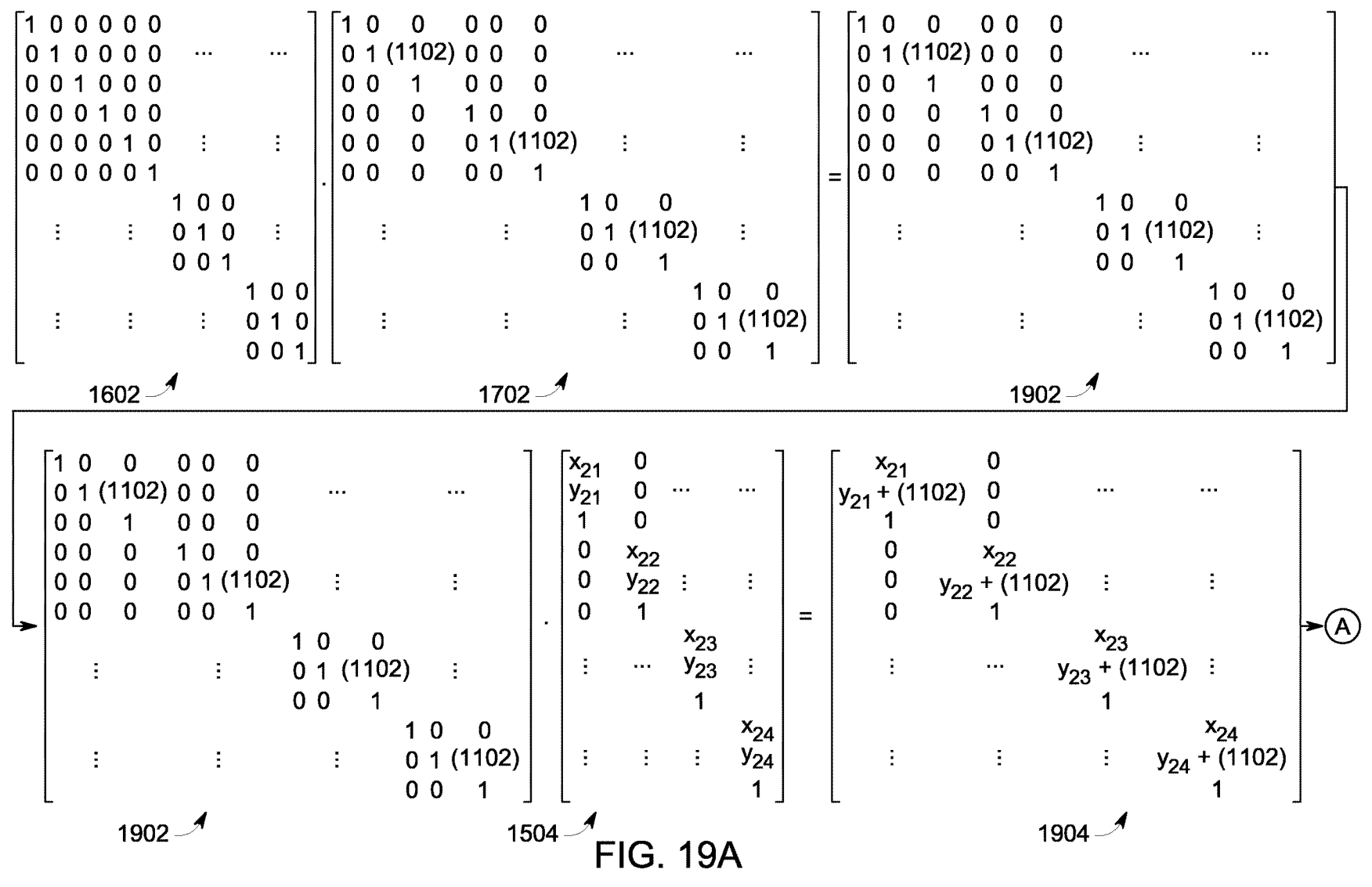

The above steps are repeated to generate 1224 a compensated digital two-dimensional cross-section for each layer of the first component. For example, referring to FIGS. 19A-C, a second CCT 1902 associated with second layer 118 is generated by applying first LCT 1702 to first CCT 1602. Second CCT 1902 is applied to second digital two-dimensional cross-section 304 by applying second CCT 1902 to second tensor matrix 1504. The resulting value, referred to as tenth tensor matrix 1904, is representative of the intermediate digital two-dimensional cross-section corresponding to second layer 118, referred to as second intermediate digital two-dimensional cross-section 2202, illustrated graphically in FIG. 22. A second LCT 1906 is determined by calculating a localized difference between a second intermediate digital two-dimensional cross-section 2202, represented by tenth tensor matrix 1904, and second layer 118, represented by fifth tensor matrix 1510. In the example embodiment, the localized difference between second intermediate digital two-dimensional cross-section 2202 and second layer 118 is equivalent to the difference between distance 1104 (i.e., the offset distance of second layer 118 from second digital two-dimensional cross-section 304) and distance 1102 (i.e., the transformative component of first CCT 1602), represented by distance 2404 in FIG. 24. Because distance 1102 is greater than distance 1104 in the example embodiment, second LCT 1906 is configured to compensate second intermediate digital two-dimensional cross-section 2202 by distance 2404 in the negative y-direction. Second LCT 1906 is applied to second intermediate digital two-dimensional cross-section 2202 by applying second LCT 1906 to tenth tensor matrix 1904. The resulting value, referred to as eleventh tensor matrix 1908, is representative of the compensated digital two-dimensional cross-section corresponding to second layer 118 of component 106, referred to as second compensated digital two-dimensional cross-section 2406, illustrated graphically in FIG. 24.

Figure 20A:
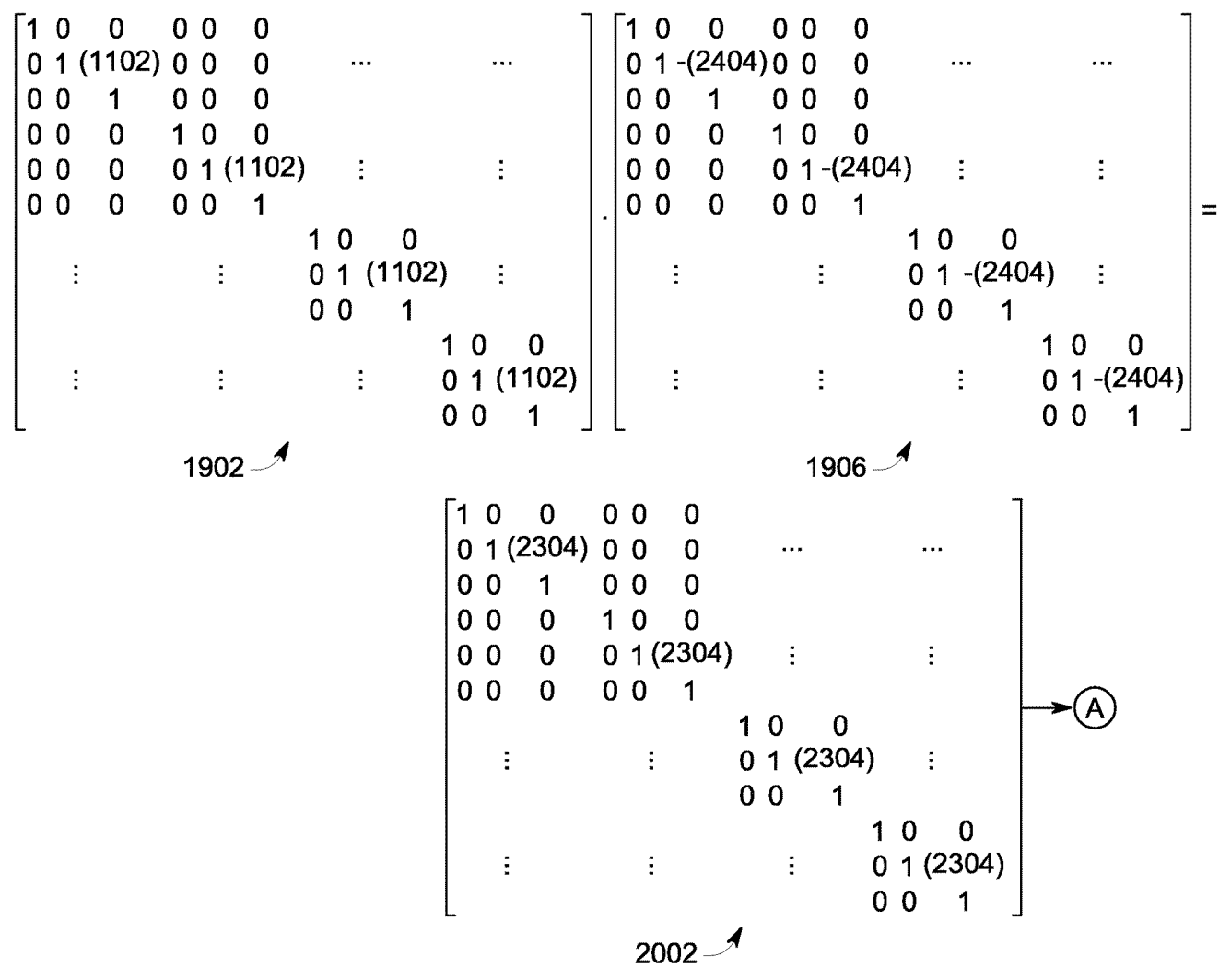
Figure 20B:
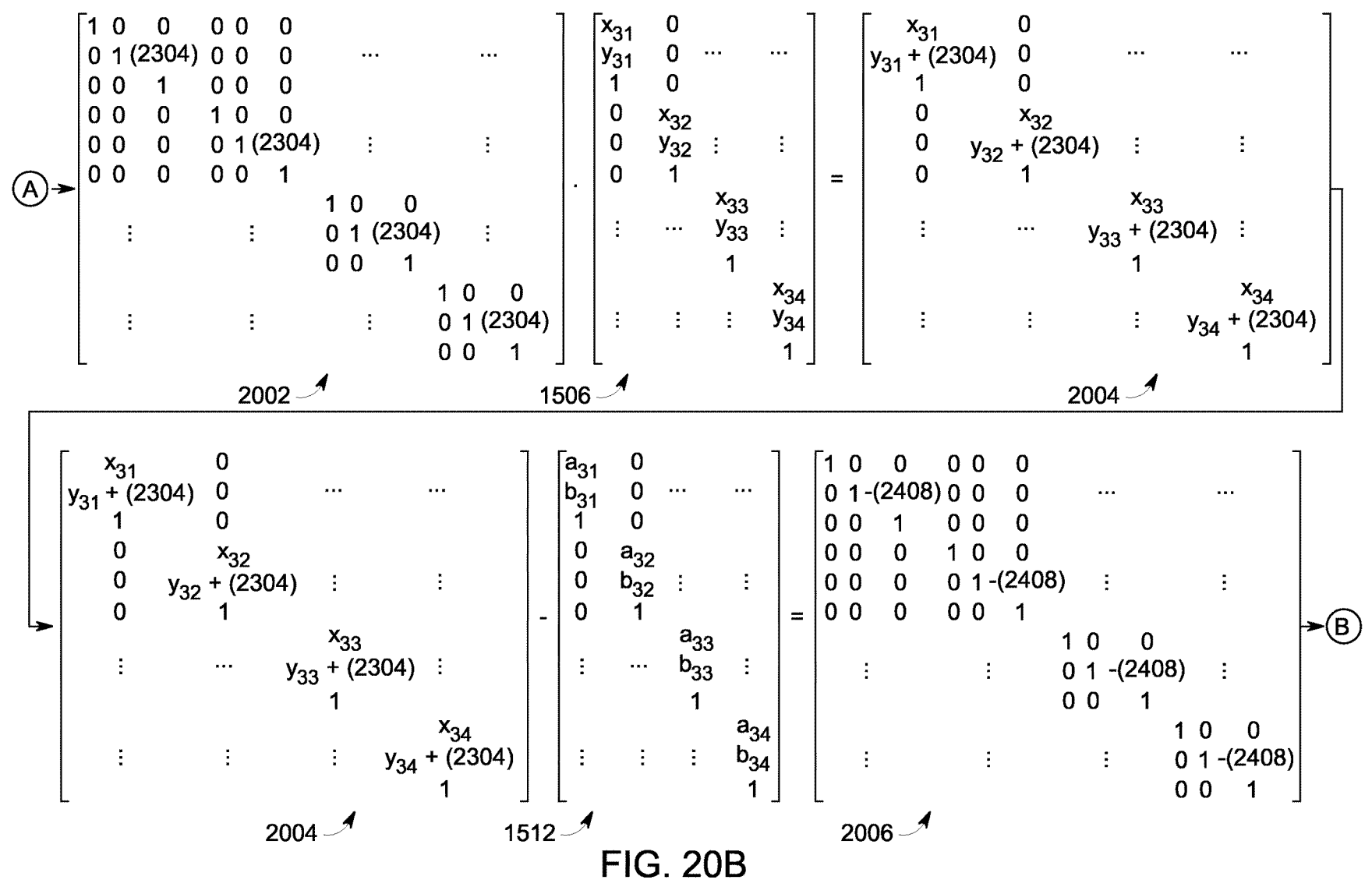

Similarly, referring to FIGS. 20A-C, a third CCT 2002 associated with third layer 120 is generated by applying second LCT 1906 to second CCT 1902. Third CCT has a transformative component 2304 equivalent to the sum of distance 1102 (i.e., the transformative component of the second CCT 1902) and distance 2404 in the negative y-direction (i.e., the transformative component of second LCT 1906). Third CCT 2002 is applied to third digital two-dimensional cross-section 306 by applying third CCT 2002 to third tensor matrix 1506. The resulting value, referred to as twelfth tensor matrix 2004 (shown in FIG. 20B), is representative of the intermediate digital two-dimensional cross-section corresponding to third layer 120, referred to as third intermediate digital two-dimensional cross-section 2302, illustrated graphically in FIG. 23. As shown in FIG. 23, third intermediate digital two-dimensional cross-section 2302 is transformed by a distance 2304 in the positive y-direction from third digital two-dimensional cross-section. A third LCT 2006 (shown in FIG. 20B) is determined by calculating a localized difference between third intermediate digital two-dimensional cross-section 2302, represented by twelfth tensor matrix 2004, and third layer 120, represented by sixth tensor matrix 1512. In the example embodiment, the localized difference between third intermediate digital two-dimensional cross-section 2302 and third layer 120 is equivalent to the difference between distance 1106 (i.e., the offset distance of third layer 120 from third digital two-dimensional cross-section 306) and distance 2304 (i.e., the transformative component of third CCT 2002), represented by distance 2408 in FIG. 24. Because distance 2304 is greater than distance 1106 in the example embodiment, third LCT 2006 is configured to compensate third intermediate digital two-dimensional cross-section 2302 by distance 2408 in the negative y-direction. Third LCT 2006 is applied to third intermediate digital two-dimensional cross-section 2302 by applying third LCT 2006 to twelfth tensor matrix 2004. The resulting value, referred to as thirteenth tensor matrix 2008 (shown in FIG. 20C), is representative of the compensated digital two-dimensional cross-section corresponding to third layer 120 of component 106, referred to as third compensated digital two-dimensional cross-section 2410, illustrated graphically in FIG. 24.

Referring again to FIG. 12, once a compensated digital two-dimensional cross-section is generated for each layer of first component, a compensated digital representation of second component may by generated 1226 based on the compensated digital two-dimensional cross-sections. FIG. 25 is a graphical illustration of a compensated digital representation 2500 generated from compensated digital two-dimensional cross-sections 2402, 2406, and 2410. In alternative embodiments, no compensated digital representation of second component is generated.

Referring again to FIG. 12, a second component may be fabricated 1228 based upon the compensated digital two-dimensional cross-sections generated for each layer in step 1222 and/or the compensated digital representation of the second component generated in step 1226. The second component may be fabricated using a method substantially similar to the method used to fabricate component 106 described above with reference to FIG. 1.

In alternative embodiments, several iterations of method 1200 may be carried out using components fabricated from previously generated compensated digital two-dimensional cross-sections and/or compensated digital representations in order to increase the precision and accuracy of components fabricated according to method 1200.

FIG. 26 is a perspective view of a desired component 2600 fabricated according to compensated digital representation 2500. Desired component includes first compensated layer 2602, second compensated layer 2604, and third compensated layer 2606. Because digital representation 2500 and compensated digital two-dimensional cross-sections 2402, 2406, and 2410 have been compensated to account for shifting and movement of layers 2602, 2604, and 2606 during fabrication, the geometric characteristics of resulting desired component 2600 have substantially less deviation from desired or predetermined specifications than component 106.

In some embodiments, the compensated digital two-dimensional cross-sections generated in step 1222 and/or the compensated digital representation of second component generated in step 1226 may be uploaded to and/or stored in a computing device different than the computing device used to generate the compensated digital two-dimensional cross-sections and/or the compensated digital representation of second component. For example, compensated digital two-dimensional cross-sections and/or the compensated digital representation of second component may be generated using a first computer of a first additive manufacturing system, and be subsequently uploaded to and/or stored in a second computer of a second additive manufacturing system used to fabricate second component. First additive manufacturing system and second additive manufacturing system may be substantially similar to additive manufacturing system 100 shown in FIG. 1. Similarly, first computing device and second computing device may be substantially similar to computing device 200 shown in FIGS. 1 and 2.

The above described systems and methods facilitate fabrication of more precise components using additive manufacturing systems. Specifically, the systems and methods described herein facilitate generating more accurate compensated digital representations for use in additive manufacturing processes. The systems and methods described herein facilitate determining a localized difference between adjacent layers within a component, and determining and applying a local compensation transformation corresponding to the localized difference to a digital representation and/or a segment of a digital representation. Therefore, in contrast to known additive manufacturing systems and methods, the systems and methods described herein provide compensated digital representations which account for localized differences between adjacent layers of components, and more precise fabricated components.

An exemplary technical effect of the systems and methods described herein includes at least one of: (a) improving the precision of components fabricated using additive manufacturing processes; (b) reducing the amount of post-fabrication processing needed to remove distortions from components fabricated by additive manufacturing processes; and (c) improving the accuracy of compensated digital representations used to fabricate components using additive manufacturing processes.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for fabricating a component, said system comprising:

an additive manufacturing device configured to fabricate a first component by sequentially forming a plurality of superposed layers based upon a nominal digital representation of a second component, wherein the nominal digital representation comprises a plurality of nominal digital two-dimensional cross-sections, each nominal digital two-dimensional cross-section corresponding to a layer of the first component; and a computing device coupled to said additive manufacturing device, said computing device comprising a memory device configured to store the nominal digital representation of the second component, said computing device further comprising a processor, wherein for an $i^{th}$ layer of the first component said processor is configured to:

(a) generate a cumulative compensation transformation associated with the $i^{th}$ layer, wherein for an initial layer of the first component, said processor is configured to generate a cumulative compensation transformation equal to an identity transformation, and wherein for a layer of the first component other than the initial layer, said processor is configured to generate a cumulative compensation transformation for the $i^{th}$ layer by applying a local compensation transformation corresponding to the $(i-1)^{th}$ layer to a cumulative compensation transformation associated with the $(i-1)^{th}$ layer;

(b) apply the cumulative compensation transformation associated with the $i^{th}$ layer to the nominal digital two-dimensional cross-section corresponding to the $i^{th}$ layer to create an intermediate digital two-dimensional cross-section corresponding to the $i^{th}$ layer;

(c) determine a local compensation transformation for the $i^{th}$ layer, wherein the local compensation transformation for the $i^{th}$ layer of the first component is based upon a difference between a geometric characteristic of the $i^{th}$ layer and a corresponding geometric characteristic of the intermediate digital two-dimensional cross-section corresponding to the $i^{th}$ layer;

(d) apply the local compensation transformation for the $i^{th}$ layer to the intermediate digital two-dimensional cross-section corresponding to the $i^{th}$ layer to create a compensated digital two-dimensional cross-section corresponding to the $i^{th}$ layer; and (e) perform (a) through (d) for at least one other layer of the first component; and wherein said additive manufacturing device is further configured to fabricate a second component based upon the compensated digital two-dimensional cross-sections.

2. The system in accordance with claim 1, wherein said processor is further configured to generate a compensated digital representation of the second component based on the compensated digital two-dimensional cross-sections.

3. The system in accordance with claim 1, wherein the geometric characteristic includes at least one of a shape, an orientation, a length, a width, and a relative position.

4. The system in accordance with claim 1, wherein said second component is an aircraft component.

5. The system in accordance with claim 1, wherein said additive manufacturing device comprises a selective laser sintering device.

6. A method of fabricating a component using an additive manufacturing process, said method comprising:
fabricating a first component by sequentially forming a plurality of superposed layers based upon a nominal digital representation of a second component, wherein the nominal digital representation comprises a plurality of nominal digital two-dimensional cross-sections, each nominal digital two-dimensional cross-section corresponding to a layer of the first component; and
for an $i^{th}$ layer of the first component:
(a) generating a cumulative compensation transformation associated with the $i^{th}$ layer, wherein for an initial layer of the first component, said processor is configured to generate a cumulative compensation transformation equal to an identity transformation, and wherein for a layer of the first component other than the initial layer, said processor is configured to generate a cumulative compensation transformation for the $i^{th}$ layer by applying a local compensation transformation corresponding to the $(i-1)^{th}$ layer to a cumulative compensation transformation associated with the $(i-1)^{th}$ layer;
(b) applying the cumulative compensation transformation associated with the $i^{th}$ layer to the nominal digital two-dimensional cross-section corresponding to the $i^{th}$ layer to create an intermediate digital two-dimensional cross-section corresponding to the $i^{th}$ layer;
(c) determining a local compensation transformation for the $i^{th}$ layer, wherein the local compensation transformation for the $i^{th}$ layer of the first component is based upon a difference between a geometric characteristic of the $i^{th}$ layer and a corresponding geometric characteristic of the intermediate digital two-dimensional cross-section corresponding to the $i^{th}$ layer;
(d) applying the local compensation transformation for the $i^{th}$ layer to the intermediate digital two-dimensional cross-section corresponding to the $i^{th}$ layer to create a compensated digital two-dimensional cross-section corresponding to the $i^{th}$ layer; and
(e) performing (a) through (d) for at least one other layer of the first component; and
(f) fabricating a second component based upon the compensated digital two-dimensional cross-sections.

7. The method in accordance with claim 6, further comprising generating a compensated digital representation of the second component based on the compensated digital two-dimensional cross-sections.

8. The method in accordance with claim 6 wherein fabricating the first component comprises a selective laser sintering process.

* * * * *